(12) United States Patent
Abbas et al.

(10) Patent No.: US 10,602,124 B2
(45) Date of Patent: Mar. 24, 2020

(54) SYSTEMS AND METHODS FOR PROVIDING A CUBIC TRANSPORT FORMAT FOR MULTI-LENS SPHERICAL IMAGING

(71) Applicant: GoPro, Inc., San Mateo, CA (US)

(72) Inventors: Adeel Abbas, Carlsbad, CA (US); Timothy Macmillan, Carlsbad, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/654,617

(22) Filed: Jul. 19, 2017

(65) Prior Publication Data

US 2018/0027226 A1    Jan. 25, 2018

Related U.S. Application Data

(60) Provisional application No. 62/363,926, filed on Jul. 19, 2016.

(51) Int. Cl.
*H04N 13/00* (2018.01)
*H04N 13/243* (2018.01)
(Continued)

(52) U.S. Cl.
CPC ......... *H04N 13/243* (2018.05); *G06K 9/4609* (2013.01); *G06K 9/52* (2013.01);
(Continued)

(58) Field of Classification Search
CPC .......... H04N 5/00; H04N 5/225; H04N 5/232; H04N 5/262; H04N 7/18; H04N 5/2628;
(Continued)

(56) References Cited

U.S. PATENT DOCUMENTS

| 5,124,915 A | * | 6/1992 | Krenzel | ................. | G01C 11/00 |
| | | | | | 702/5 |
| 7,391,450 B2 | * | 6/2008 | Pinto | ...................... | G06T 5/006 |
| | | | | | 348/251 |

(Continued)

OTHER PUBLICATIONS

U.S. Appl. No. 15/234,869, filed with the U.S. Patent and Trademark Office Aug. 11, 2016.
(Continued)

*Primary Examiner* — Frank F Huang
(74) *Attorney, Agent, or Firm* — Gazdzinski & Associates, PC

(57) ABSTRACT

Apparatus and methods for providing a frame packing arrangement for the encoding/decoding of, for example, panoramic content. In one embodiment, the frame packing arrangement utilizes overlapping imaging data so as to enable, for example, a post-decode stitching operation to be performed. The frame packing arrangement may utilize a number of projection formats, such as a cubemap projection, and may utilize any number of differing aspect ratios such as, without limitation, 4×3, 3×2, 4×2, 2×4 aspect ratios. Additionally, the overlapping imaging data may be positioned within the frame packing arrangement chosen so as to improve upon coding efficiency. For example, the overlapping imaging data may be positioned within the frame packing arrangement so as to emphasize image continuity. An encoder apparatus and decoder apparatus for use with the aforementioned frame packing arrangements are also disclosed.

20 Claims, 19 Drawing Sheets

(51) Int. Cl.

| | |
|---|---|
| *H04N 5/232* | (2006.01) |
| *G06T 3/00* | (2006.01) |
| *G06T 7/38* | (2017.01) |
| *G06T 7/73* | (2017.01) |
| *G06T 7/593* | (2017.01) |
| *H04N 19/136* | (2014.01) |
| *H04N 19/44* | (2014.01) |
| *G06K 9/46* | (2006.01) |
| *G06K 9/52* | (2006.01) |
| *G06K 9/62* | (2006.01) |
| *G06T 3/20* | (2006.01) |
| *G06T 7/00* | (2017.01) |
| *G06T 11/60* | (2006.01) |
| *G06T 15/20* | (2011.01) |
| *H04N 13/302* | (2018.01) |
| *H04N 13/344* | (2018.01) |
| *H04N 13/10* | (2018.01) |
| *H04N 13/334* | (2018.01) |
| *H04N 13/282* | (2018.01) |
| *G06T 7/55* | (2017.01) |
| *H04N 5/265* | (2006.01) |
| *H04N 13/161* | (2018.01) |

(52) U.S. Cl.
CPC ......... *G06K 9/6201* (2013.01); *G06K 9/6212* (2013.01); *G06T 3/0043* (2013.01); *G06T 3/0068* (2013.01); *G06T 3/20* (2013.01); *G06T 7/0002* (2013.01); *G06T 7/38* (2017.01); *G06T 7/55* (2017.01); *G06T 7/593* (2017.01); *G06T 7/73* (2017.01); *G06T 11/60* (2013.01); *G06T 15/20* (2013.01); *H04N 5/23238* (2013.01); *H04N 5/265* (2013.01); *H04N 13/10* (2018.05); *H04N 13/282* (2018.05); *H04N 13/302* (2018.05); *H04N 13/334* (2018.05); *H04N 13/344* (2018.05); *H04N 19/136* (2014.11); *H04N 19/44* (2014.11); *G06T 2200/04* (2013.01); *G06T 2207/20221* (2013.01); *H04N 13/161* (2018.05)

(58) Field of Classification Search
CPC .. H04N 5/23238; H04N 7/181; H04N 5/2258; G02B 13/00
See application file for complete search history.

(56) References Cited

U.S. PATENT DOCUMENTS

| | | | |
|---|---|---|---|
| 7,408,576 B2* | 8/2008 | Pinto | H04N 5/217 348/251 |
| 7,834,921 B1* | 11/2010 | Pinto | G06T 5/006 348/251 |
| 8,296,656 B2* | 10/2012 | Dowdy | G06F 17/30775 715/727 |
| 9,330,436 B2 | 5/2016 | MacMillan | |
| 9,571,759 B1 | 2/2017 | Adsumilli | |
| 9,685,088 B2* | 6/2017 | Trent | G08G 5/0034 |
| 9,984,494 B2* | 5/2018 | Pylvaenaeinen | G06T 15/205 |
| 9,992,502 B2* | 6/2018 | Abbas | H04N 19/146 |
| 10,063,792 B1* | 8/2018 | Brailovskiy | H04N 5/2628 |
| 2006/0055710 A1* | 3/2006 | Lo | G09G 5/14 345/629 |
| 2008/0247602 A1* | 10/2008 | Fields | G06K 9/209 382/106 |
| 2009/0143967 A1* | 6/2009 | Lee | B60R 1/00 701/119 |
| 2009/0177989 A1* | 7/2009 | Ma | G06F 3/0482 715/766 |
| 2010/0045773 A1 | 2/2010 | Ritchey | |
| 2010/0145495 A1* | 6/2010 | Terai | D04B 37/02 700/141 |
| 2010/0165104 A1* | 7/2010 | Fujita | B60R 1/00 348/148 |
| 2010/0306657 A1* | 12/2010 | Derbyshire | G06F 17/30749 715/727 |
| 2011/0069084 A1* | 3/2011 | Brown | G02B 26/0816 345/606 |
| 2011/0193814 A1* | 8/2011 | Gay | G02B 27/2221 345/173 |
| 2011/0249153 A1* | 10/2011 | Hirooka | B60R 1/00 348/241 |
| 2015/0117784 A1* | 4/2015 | Lin | G06K 9/4671 382/195 |
| 2015/0341552 A1* | 11/2015 | Chen | H04N 5/23238 348/38 |
| 2016/0057380 A1* | 2/2016 | Liu | H04N 5/913 386/254 |
| 2016/0088287 A1* | 3/2016 | Sadi | H04N 13/254 348/43 |
| 2016/0210445 A1* | 7/2016 | Deaver | G06F 21/12 |
| 2016/0249038 A1 | 8/2016 | Mosleh | |
| 2017/0006219 A1 | 1/2017 | Adsumilli | |
| 2017/0046820 A1 | 2/2017 | Steel | |
| 2017/0091970 A1 | 3/2017 | Adsumilli | |
| 2017/0150122 A1 | 5/2017 | Cole | |

OTHER PUBLICATIONS

U.S. Appl. No. 14/872,063, filed with the U.S. Patent and Trademark Office Sep. 30, 2015.

* cited by examiner

SYSTEMS AND METHODS FOR PROVIDING A CUBIC TRANSPORT FORMAT FOR MULTI-LENS SPHERICAL IMAGING

PRIORITY

This application claims the benefit of priority to U.S. Provisional Patent Application Ser. No. 62/363,926 filed Jul. 19, 2016 and entitled "Cubic Transport Format for Twin-Lens Spherical Imaging", the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video image processing and in one exemplary aspect, to methods and apparatus for providing a frame packing arrangement for panoramic, 360° or virtual reality (VR) images.

Description of Related Art

Panoramic images (e.g., spherical images) are typically obtained by capturing multiple images with overlapping fields of view from different cameras and combining ("stitching") these images together in order to provide, for example, a two-dimensional projection for use with modern display devices. Converting a panoramic image to a two-dimensional projection format can introduce some amount of distortion and/or affect the subsequent imaging data. However, two-dimensional projections are desirable for compatibility with existing image processing techniques and also for most user applications. In particular, many encoders and compression techniques assume traditional rectangular image formats.

Additionally, many extant image capturing devices that are configured to capture panoramic content have on-board stitching capabilities. For example, a twin-lens image capture device arranged in a so-called Janus configuration may output a fully stitched panoramic image. However, these image capturing devices are often times portable and may have limited processing resources. Accordingly, the stitching operations performed by these image capturing devices may output sub-optimally stitched images.

While techniques exist that enable the encoding/decoding of this so-called panoramic content, extant frame packing arrangement techniques for these panoramic images may not provide for the ability to improve upon on-board (i.e., on-camera) stitching. Accordingly, methods and apparatus are needed which allow for improved post-processed image stitching capabilities.

SUMMARY

The present disclosure satisfies the foregoing needs by providing, inter alia, methods and apparatus for providing a frame packing arrangement for panoramic images.

In one aspect, an encoder apparatus is disclosed. In one embodiment, the encoder apparatus includes a processor apparatus and a non-transitory computer-readable storage apparatus, the computer-readable storage apparatus comprising a storage medium comprising computer-readable instructions, the computer-readable instructions being configured to, when executed by the processor apparatus: receive a panoramic image that has been captured by two or more image capture devices, the panoramic image including an overlapping portion that has been captured by at least two of the two or more image capture devices; arrange non-overlapping portions of the panoramic image into a transport format; arrange the overlapping portion of the panoramic image within the transport format; and encode the arranged non-overlapping portions and the arranged overlapping portion of the panoramic image in order to produce an encoded image.

In one variant, the transport format includes a cubemap projection and the arrangement of the overlapping portion of the panoramic image includes arrangement of the overlapping portion of the panoramic image within a separate facet of the cubemap projection.

In another variant, the transport format includes a cubemap projection, the cubemap projection including a stitch line that bisects four imaging facets of the cubemap projection and the arrangement of the overlapping portion of the panoramic image includes an arrangement of the overlapping portion of the panoramic image between the bisected four imaging facets of the cubemap projection.

In yet another variant, the transport format includes a cubemap projection, the cubemap projection including a stitch line that bisects four imaging facets of the cubemap projection and the arrangement of the overlapping portion of the panoramic image includes an arrangement of the overlapping portion as a watermark within the four bisected imaging facets.

In yet another variant, the computer-readable instructions are further configured to, when executed by the processor apparatus: arrange the transport format into a 4×3 aspect ratio, the 4×3 aspect ratio including four facets in a width dimension and three facets in a vertical dimension.

In yet another variant, the arrangement of the overlapping portion of the panoramic image further includes an arrangement of the overlapping portion of the panoramic image within a single facet of the 4×3 aspect ratio.

In yet another variant, the arrangement of the overlapping portion of the panoramic image further includes an arrangement for the overlapping portion of the panoramic image such that the overlapping portion is arranged in a substantially contiguous manner.

In a second aspect, a decoder apparatus is disclosed. In one embodiment, the decoder apparatus includes a processor apparatus and a non-transitory computer-readable storage apparatus, the computer-readable storage apparatus comprising a storage medium comprising computer-readable instructions, the computer-readable instructions being configured to, when executed by the processor apparatus: decode faces with a stitch line and overlapping portions of a transport format; apply a full-stitching algorithm to the decoded faces and overlapping portions; decode untouched faces; and render an output for display.

In another embodiment, the decoder apparatus includes a processor apparatus and a non-transitory computer-readable storage apparatus, the computer-readable storage apparatus comprising a storage medium comprising computer-readable instructions, the computer-readable instructions being configured to, when executed by the processor apparatus: receive an encoded transport format associated with a panoramic image that includes overlap data; determine whether to discard the overlap data; if the determination is yes, render the transport format as a cut along a stitch line; and if the determination is no, fully-stitch the panoramic image using decoded overlap data.

In a third aspect, an encoding/decoding apparatus is disclosed. In one embodiment, the encoding/decoding apparatus is configured to encode and decode panoramic content that includes overlap imaging data.

In a fourth aspect, a method for encoding imaging data is disclosed. In one embodiment, the method includes receiving a panoramic image that has been captured by two or more image capture devices, the panoramic image including an overlapping portion that has been captured by at least two of the two or more image capture devices; arranging non-overlapping portions of the panoramic image into a transport format; arranging the overlapping portion of the panoramic image within the transport format; and encoding the arranged non-overlapping portions and the arranged overlapping portion of the panoramic image.

In one variant, the transport format includes a cubemap projection and the arranging of the overlapping portion of the panoramic image includes arranging the overlapping portion of the panoramic image within a separate facet of the cubemap projection.

In another variant, the transport format includes a cubemap projection, the cubemap projection including a stitch line that bisects four imaging facets of the cubemap projection and the arranging of the overlapping portion of the panoramic image includes arranging the overlapping portion of the panoramic image between the bisected four imaging facets of the cubemap projection.

In yet another variant, the transport format includes a cubemap projection, the cubemap projection including a stitch line that bisects four imaging facets of the cubemap projection and the arranging of the overlapping portion of the panoramic image includes arranging the overlapping portion as a watermark within the four bisected imaging facets.

In yet another variant, the method includes arranging the transport format in a 4×3 aspect ratio, the 4×3 aspect ratio including four facets in a width dimension and three facets in a vertical dimension.

In yet another variant, the method includes arranging the transport format in a 4×2 aspect ratio, the 4×2 aspect ratio including four facets in a width dimension and two facets in a vertical dimension.

In yet another variant, the arranging of the overlapping portion of the panoramic image further includes arranging the overlapping portion of the panoramic image within two facets of the 4×2 aspect ratio.

In yet another variant, the arranging of the overlapping portion of the panoramic image further includes arranging the overlapping portion of the panoramic image such that the overlapping portion is arranged in a substantially contiguous manner.

In a fifth aspect, a method for decoding imaging data is disclosed. In one embodiment, the method includes decoding faces with a stitch line and decode overlapping portions of a transport format; applying a full-stitching algorithm to the decoded faces and the decoded overlapping portions of the transport format; and rendering an output for display.

In a sixth aspect, a computer-readable storage apparatus is disclosed. In one embodiment, the computer-readable storage apparatus includes a storage medium comprising computer-readable instructions, the computer-readable instructions being configured to, when executed by a processor apparatus, to perform at least a portion of the aforementioned methodologies described herein.

In a seventh aspect, an integrated circuit (IC) apparatus is disclosed. In one embodiment, the IC apparatus includes logic configured to: receive a panoramic image that has been captured by two or more image capture devices, the panoramic image including an overlapping portion that has been captured by at least two of the two or more image capture devices; arrange non-overlapping portions of the panoramic image into a transport format; arrange the overlapping portion of the panoramic image within the transport format; and encode the arranged non-overlapping portions and the arranged overlapping portion of the panoramic image in order to produce an encoded image.

In an eighth aspect, a computing device is disclosed. In one embodiment, the computing device includes a processor apparatus and a non-transitory computer-readable storage apparatus, the computer-readable storage apparatus comprising a storage medium comprising computer-readable instructions, the computer-readable instructions being configured to, when executed by the processor apparatus: receive a panoramic image that has been captured by two or more image capture devices, the panoramic image including an overlapping portion that has been captured by at least two of the two or more image capture devices; arrange non-overlapping portions of the panoramic image into a transport format; and arrange the overlapping portion of the panoramic image within the transport format.

Other features and advantages of the present disclosure will immediately be recognized by persons of ordinary skill in the art with reference to the attached drawings and detailed description of exemplary implementations as given below.

All Figures disclosed herein are © Copyright 2016-2017 GoPro, Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while primarily discussed in the context of encoding and decoding of images using cubic projections, it would be readily appreciated by one of ordinary skill given the contents of the present disclosure that the principles described herein may be readily applied to other projection formats including, without limitation, Equal Area Projections (EAP) including, for example, Equi-Angular Cubemap Projections, Equirectangular Projections (ERP), various polyhedron projections (e.g., tetrahedron, octahedron, icosidodecahedron, etc.), Segmented Sphere Projections (SSP), and Rotated Sphere Projections (RSP) such as those described in co-owned and co-pending U.S. Provisional Patent Application Ser. No. 62/477,936 filed Mar. 28, 2017 and entitled "Methods and Apparatus for Providing a Frame Packing Arrangement for Panoramic Content", the contents of which being incorporated herein by reference in its entirety.

Additionally, while primarily discussed in the context of twin-lens image capturing devices that are arranged in a so-called Janus configuration, it would be readily apparent to one of ordinary skill given the contents of the present disclosure that the principles described herein may be readily applied to image capture devices with more than two (e.g., three or more) camera lenses.

These and other variations would be readily apparent to one of ordinary skill given the contents of the present disclosure.

Exemplary Frame Packing Arrangement for Projections—

Figure 1A:
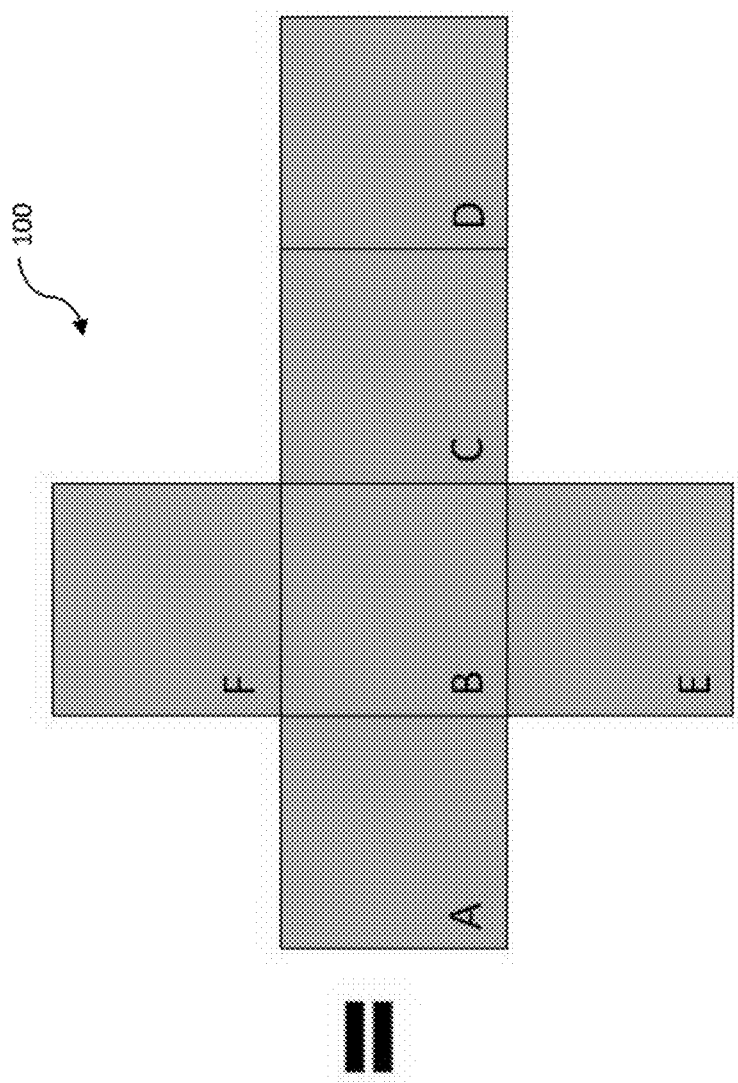
FIG. 1A is a graphical representation of an exemplary 4×3 frame packing arrangement for cubic projections, useful in describing the principles of the present disclosure.
Figure 1A:
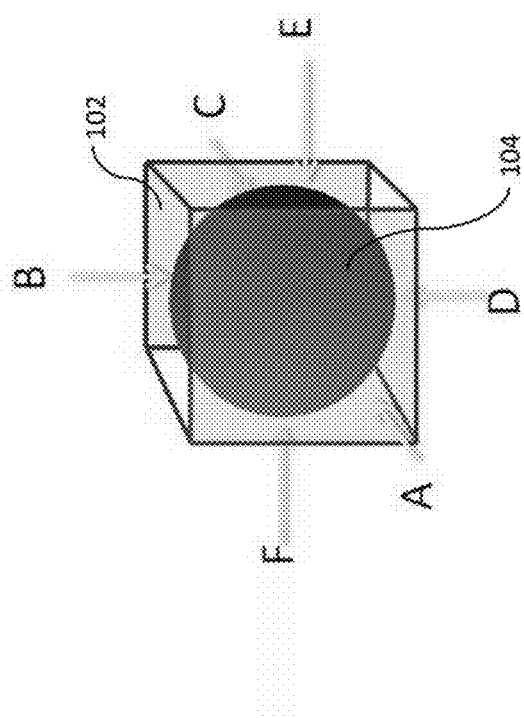
Figure 1B:
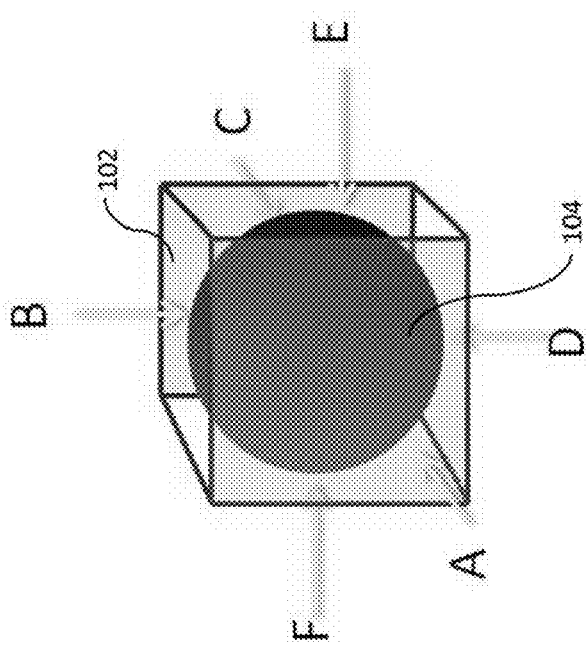
FIG. 1B is a graphical representation of an exemplary 3×2 frame packing arrangement for cubic projections, useful in describing the principles of the present disclosure.
Figure 1B:
Figure 1B:
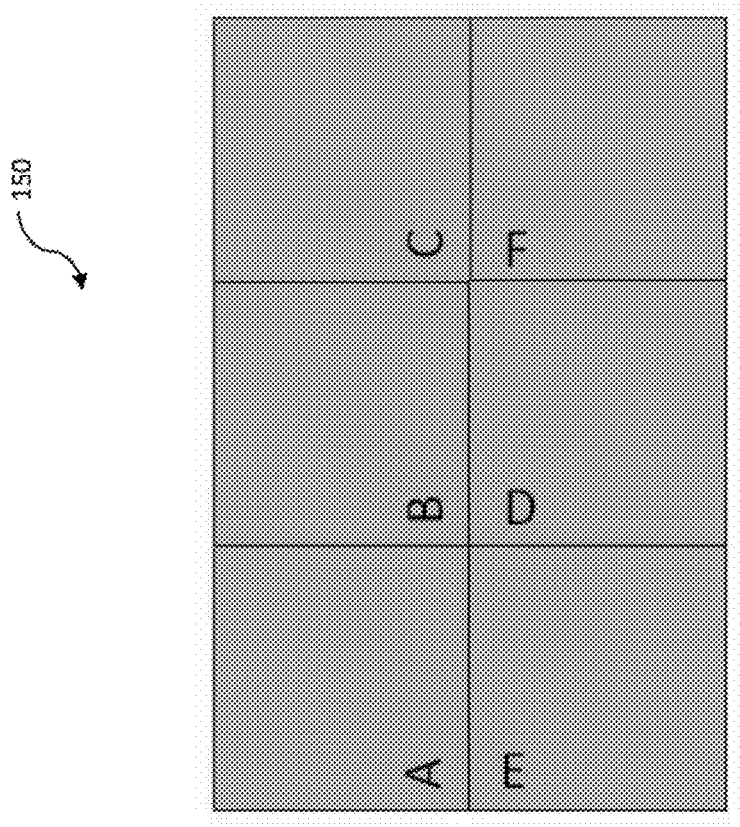

Referring now to FIG. 1A, an exemplary 4×3 frame packing arrangement 100 for cubic projections is shown and described in detail. As used herein, the term "4×3" refers to the fact that the frame packing arrangement includes four (4) image facets in the horizontal direction and three (3) image facets in the vertical direction. A cube 102 is depicted that surrounds a spherical captured image 104. The cube includes a front face A, a top face B, a back face C, a bottom face D, a right face E, and a left face F. The faces A, B, C, D, E, and F of the cube correspond to the respective facets located on the 4×3 frame packing arrangement 100. An exemplary 3×2 frame packing arrangement 150 for each of the faces A, B, C, D, E, F is illustrated in FIG. 1B. As used herein, the term "3×2" refers to the fact that the frame packing arrangement includes three (3) image facets in the horizontal direction and two (2) image facets in the vertical direction.

Figure 2A:
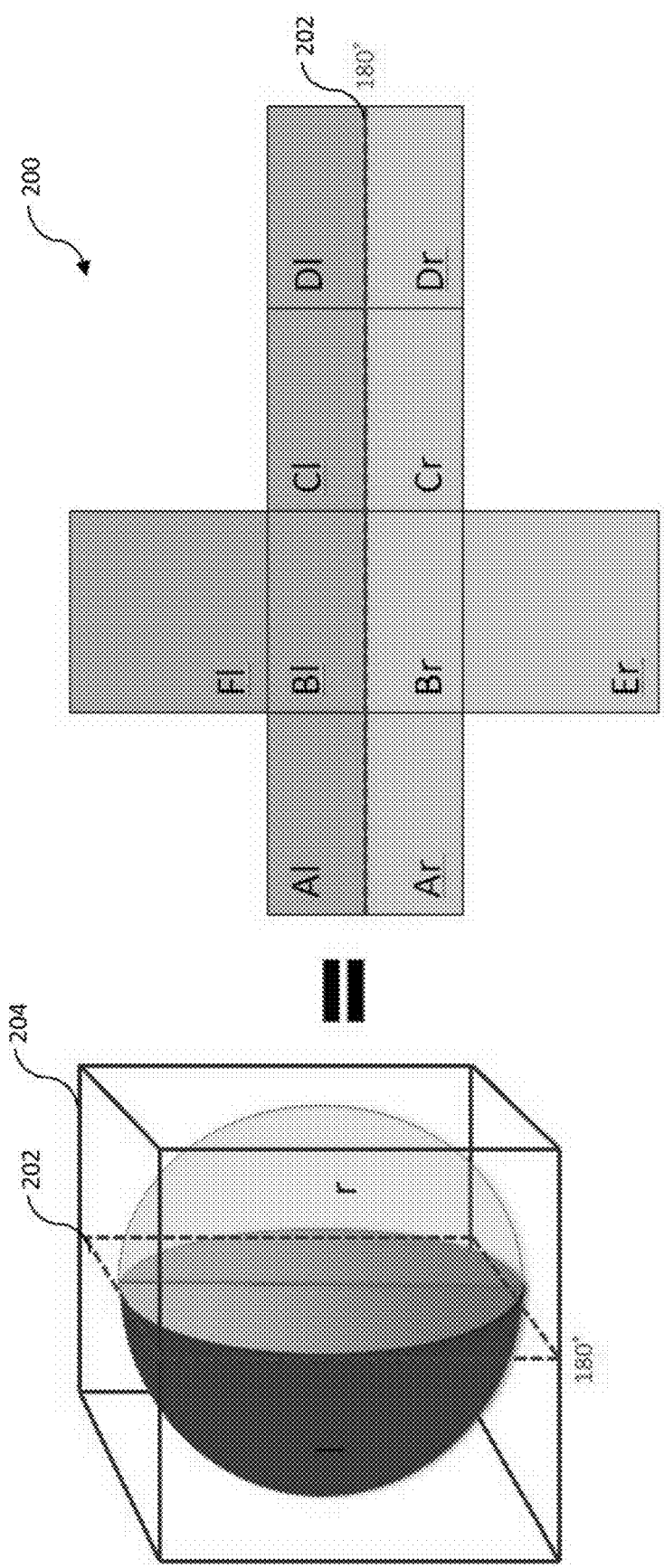
FIG. 2A is a graphical representation of an exemplary 4×3 frame packing arrangement for cubic projections captured by a twin-lens image capture device, useful in describing the principles of the present disclosure.
Figure 2B:
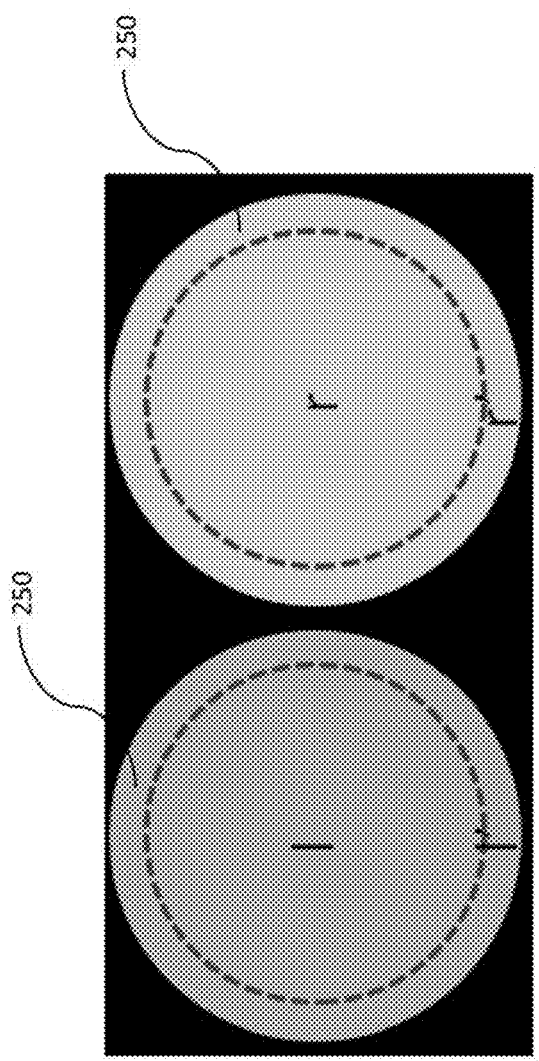
FIG. 2B is a graphical representation of spherical imaging content captured by a twin-lens image capture device, useful in describing the principles of the present disclosure.
Figure 3A:
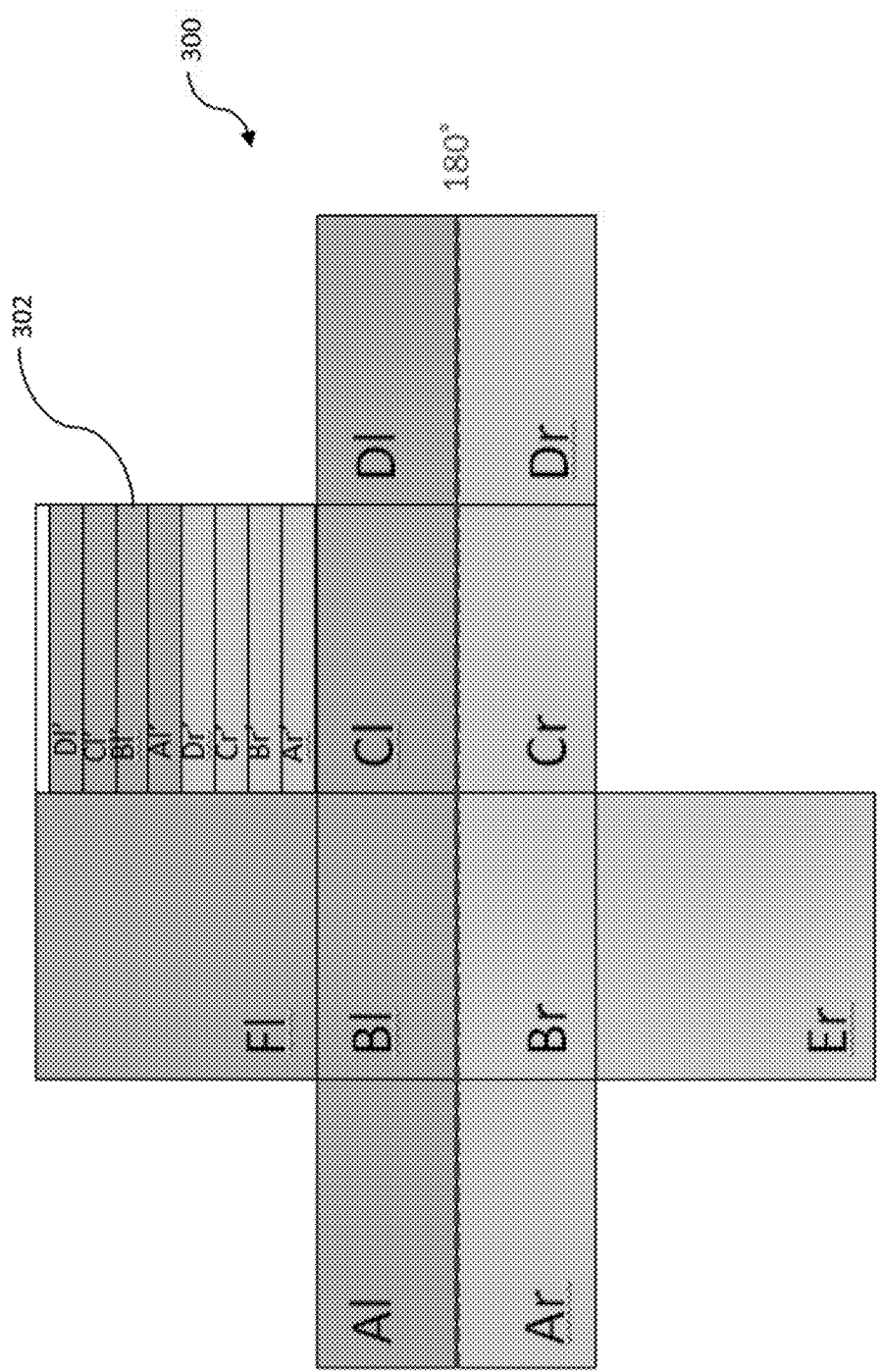
FIG. 3A is a graphical representation of a first exemplary 4×3 frame packing arrangement for cubic projections that includes overlap data, useful in describing the principles of the present disclosure.
Figure 3B:
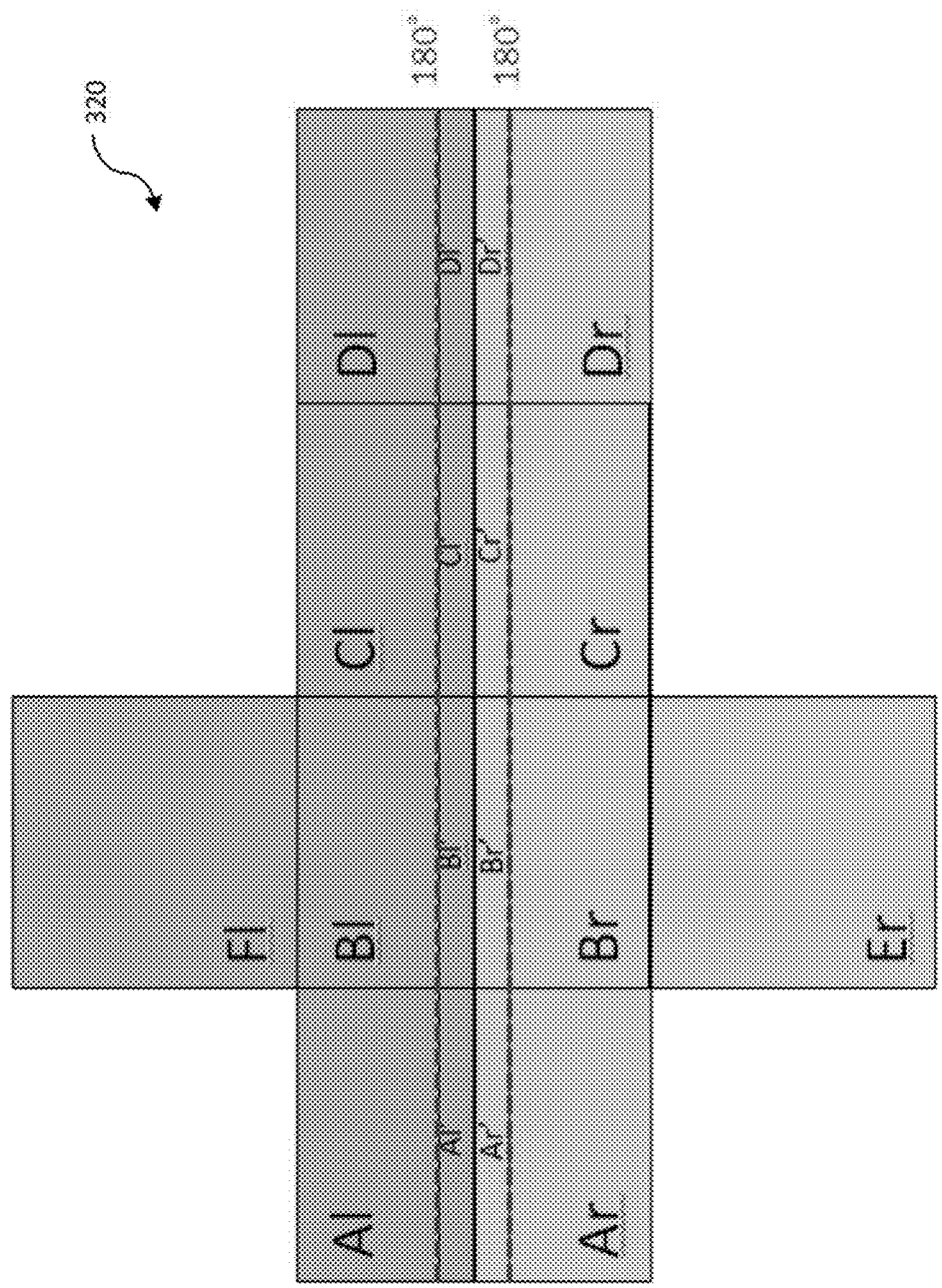
FIG. 3B is a graphical representation of a second exemplary 4×3 frame packing arrangement for cubic projections that includes overlap data, useful in describing the principles of the present disclosure.
Figure 3C:
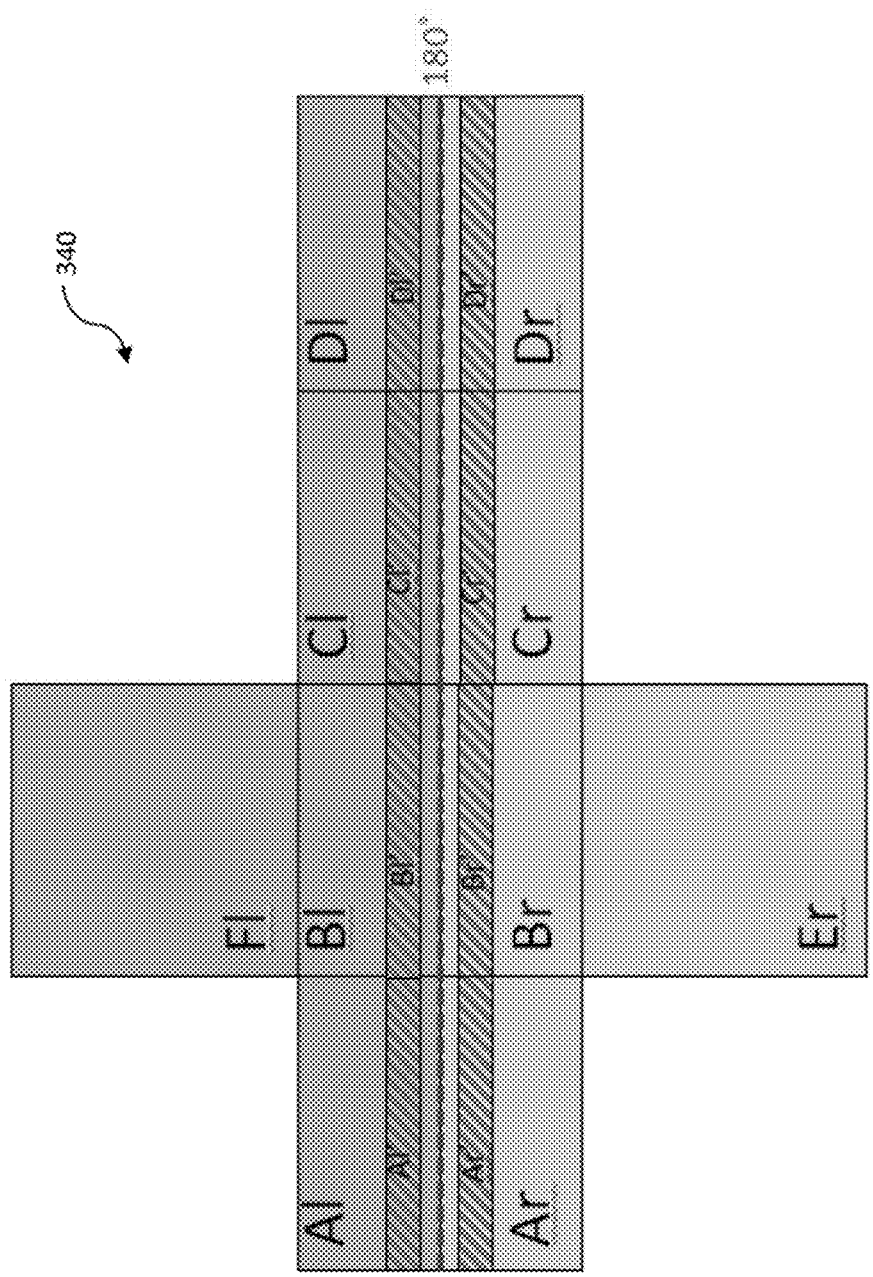
FIG. 3C is a graphical representation of a third exemplary 4×3 frame packing arrangement for cubic projections that includes overlap data, useful in describing the principles of the present disclosure.

Referring now to FIG. 2A, an exemplary 4×3 frame packing arrangement 200 that incorporates a longitudinal stitch line 202 across four (4) faces of the cube 204. This longitudinal stitch line 202 corresponds to the points in space in which images captured by a twin-lens image capture device (denoted by "l" (meaning left) and "r" (meaning right)) begin to overlap with one another. For example, one lens (e.g., the "l" lens) may have more than a 180° field of view (FOV) (e.g., between 180° and 190° as but one example), while the other lens (e.g., the "r" lens) may also have more than a 180° FOV (e.g., between 180° and 190° as but one example). The portion where the left and right lens overlap in their FOV is depicted by region 250 in FIG. 2B (also denoted by l' and r'). As a brief aside, extant image capture devices may perform image stitching on the captured images prior to transmission to, for example, a storage device (e.g., a computer-readable apparatus). After performing this image stitching operation, the overlap regions l' and r' are typically discarded (e.g., deleted) prior to transmission. Accordingly, since these regions are discarded prior to transmission, more computationally intensive image stitching may not be performed subsequent to transmission. FIGS. 3A-3C illustrate various frame packing arrangements in which this overlap region data is, instead of being discarded, included with the imaging data in, for example, a cubic projection.

FIG. 3A illustrates a first exemplary 4×3 frame packing arrangement 300 for cubic projections that includes this overlap imaging data. Image facets Fl and Er are encoded from portions of an image captured by the left and right camera lenses, respectively. Conversely, image facets A, B, C, D are encoded from portions of an image captured by both the left and right camera lenses. For example, image facet A is composed of a portion of the image captured by the left-facing camera (e.g., Al) and a portion of the image captured by the right-facing camera (e.g., Ar). Similarly, image facets B, C, D are also composed of portions of the image captured by both the left-facing camera (e.g., Bl, Cl, Dl) and a portion of the image captured by the right-facing camera (e.g., Br, Cr, Dr). The overlap regions (e.g., where imaging data is captured redundantly by both the left-facing and right-facing cameras) are encoded as a separate imaging facet 302.

As depicted, the overlap regions are encoded into a separate imaging facet to the right of image facet Fl and above image facet Cl; however, other possibilities exist as well. For example, this separate imaging facet with the overlap regions may be encoded above image facet Al, may be encoded below image facet Ar, may be encoded below image facet Cr, may be encoded above image facet Dl, or may be encoded below image facet Dr in some implementations. Additionally, the arrangement of the overlap portions may be encoded within the overlap imaging facet 302 as depicted in FIG. 3A which is, from top-to-bottom arranged as Dl', Cr, Bl', Al', Dr', Cr', Br', and Ar'. In some implementations, it may be desirable to encode these overlap imaging portions in a more contiguous manner so as to enable, for example, improved compression efficiency for the encoded frame packing arrangement 300. In such an implementation, it may be desired to arrange the overlap portions from top-to-bottom as, for example, Al', Ar', Bl', Br', Cl', Cr', Dl', Dr' within the overlap imaging facet 302. In some implementations, it may be desirable to rotate these overlap imaging portions by 90° (or 270°) so that the overlap imaging portions run from left-to-right, as opposed to top-to-bottom as depicted in FIG. 3A. These and other arrangements would be readily apparent to one of ordinary skill given the contents of the present disclosure.

FIG. 3B illustrates a second exemplary 4×3 frame packing arrangement 320 for cubic projections that includes this overlap imaging data. In this illustrated variant, the overlap portions are encoded between the non-overlap portions. In other words, overlap portions Al' and Ar' may be encoded between Al and Ar. Similarly, overlap portions Bl' and Br' may be encoded between Bl and Br, while overlap portions Cr and Cr' may be encoded between Cl and Cr and overlap portions Dl' and Dr' may be encoded between Dl and Dr. Such an arrangement 320 may improve upon compression efficiency during the encoding process due to improved continuity for the captured panoramic content; however, the illustrated frame packing arrangement may have, for example, a larger footprint than that depicted in FIG. 3A. In other words, the arrangement 320 illustrated may not be a true 4×3 frame packing arrangement; rather, the frame packing arrangement may actually be a 4×3+overlap region frame packing arrangement. In some implementations, this extra height may not be problematic dependent upon the codec chosen for the encoding/decoding process; however, in some implementations, this extra height may be problematic and/or undesirable. For codecs where this extra height may be problematic, it may be desired to utilize the methodology described with regards to FIG. 3A supra or alternatively, as discussed with respect to FIG. 3C discussed infra. However, the methodology of FIG. 3B may produce an improved imaging quality as compared with the methodologies of FIGS. 3A and 3C, respectively.

FIG. 3C illustrates a third exemplary 4×3 frame packing arrangement 340. Unlike the frame packing arrangement 320 of FIG. 3B, frame packing arrangement 340 may consist of a true 4×3 frame packing arrangement. In the illustrated variant, the overlap portions Al', Ar', Bl', Br', Cr, Cr', Dl', and Dr' may be encoded within image facets Al, Ar, Bl, Br, Cl, Cr, Dl, Dr as an image watermark so as to maintain the 4×3 aspect ratio. In some implementations, the overlap portions may be encoded in metadata. In other implementations, the overlap portions may be encoded in other extra-image encoding formats. However, such a frame packing arrangement 340 is not without drawbacks. In other words, some of the information associated with the non-overlapping (e.g., Al) and overlapping (e.g., Al') region of the image necessarily may be missing. However, the frame packing arrangement 340 of FIG. 3C has benefits in terms of having a true 4×3 aspect ratio as compared with, for example, the frame packing arrangement 320 illustrated in FIG. 3B. Accordingly, the frame packing arrangement 340 illustrated in FIG. 3C may have utility with a larger number of codecs as compared with, for example, the frame packing arrangement 320 illustrated in FIG. 3B.

Figure 4A:
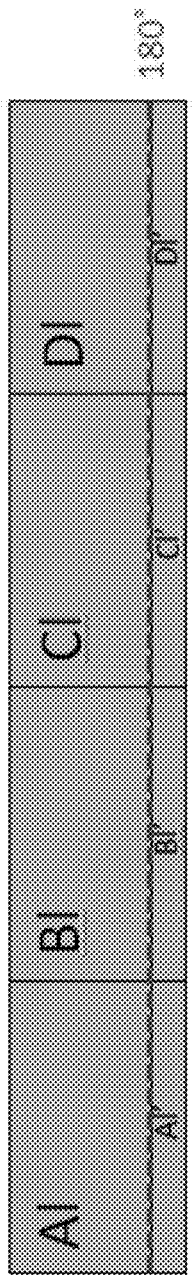
FIGS. 4A-4D are exemplary graphical representations of various ways of decoding and applying post-stitching methodologies post-decode, useful in describing the principles of the present disclosure.
Figure 4A:
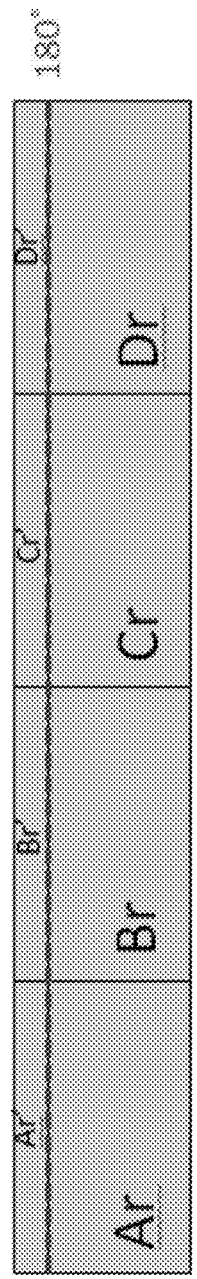
Figure 4B:
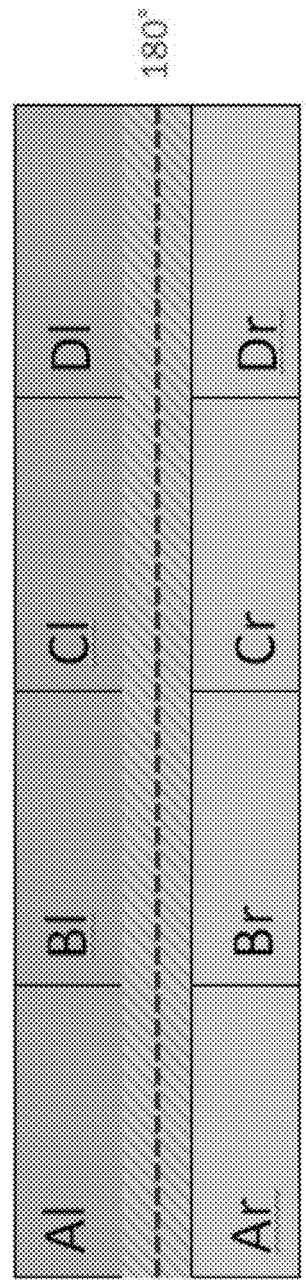
Figure 4C:
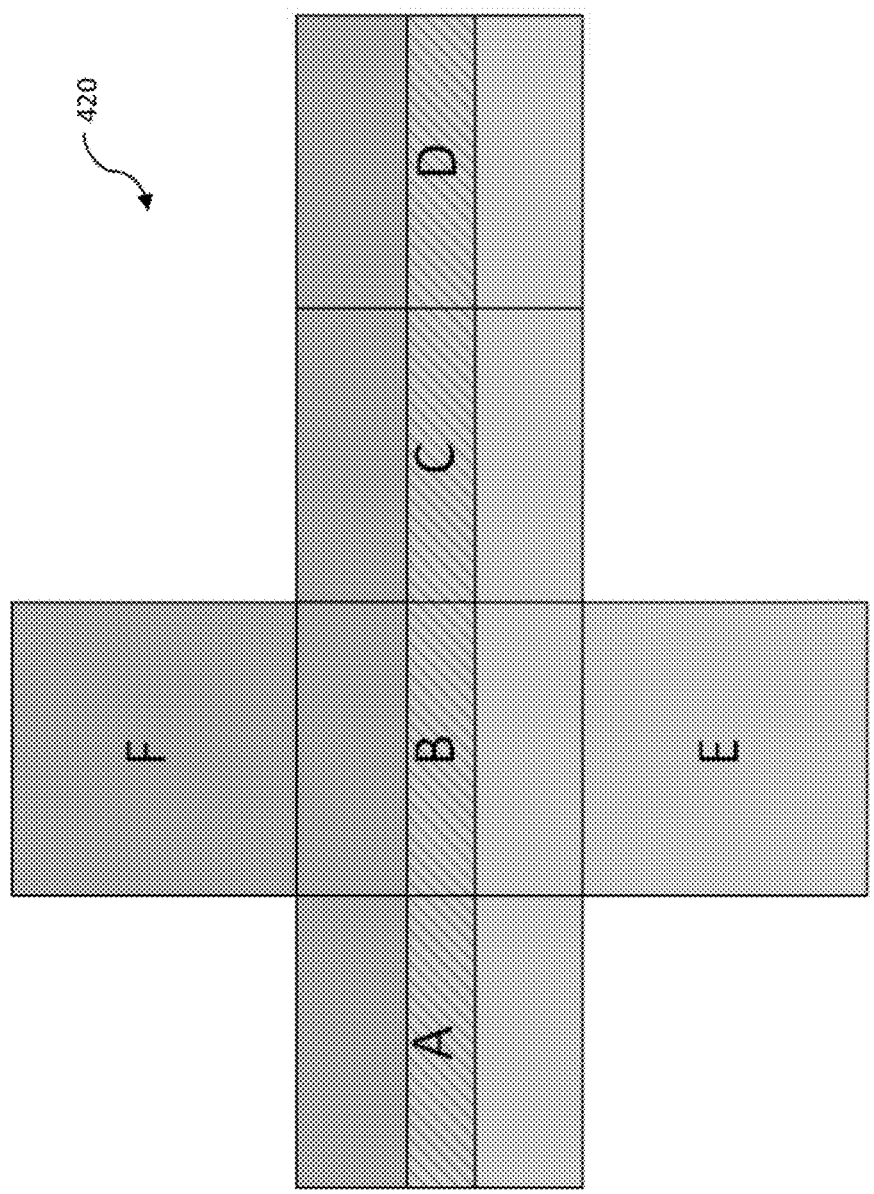
Figure 4D:
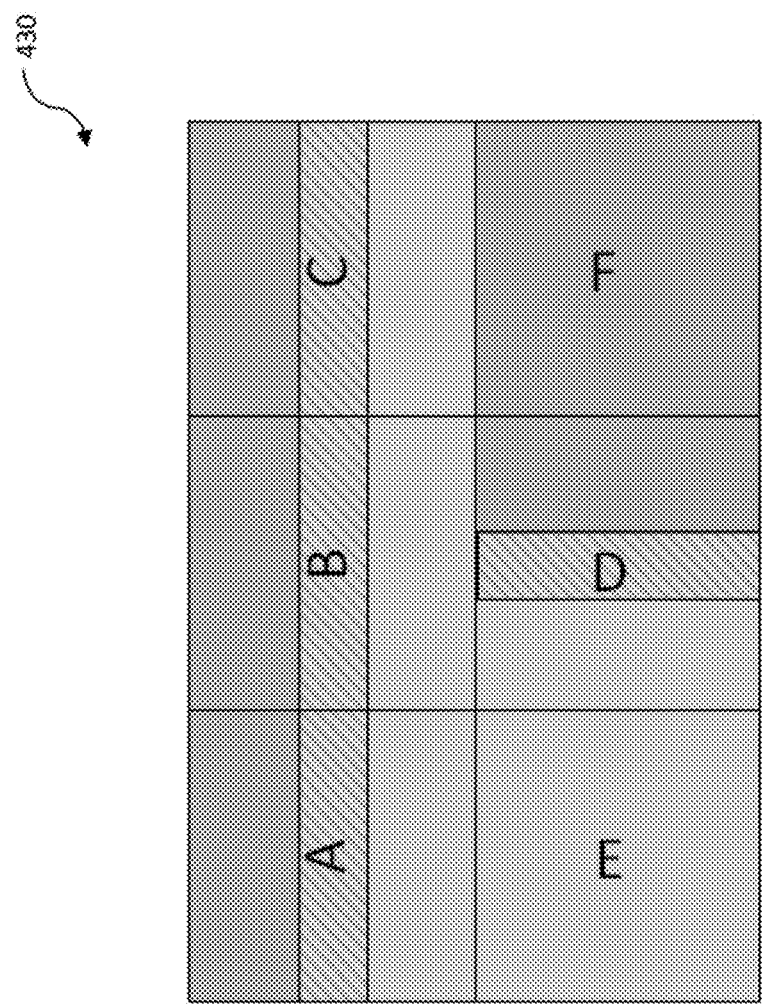

Referring now to FIGS. 4A-4D, exemplary graphical representations of various ways of decoding and applying post-stitching methodologies post-decode for, for example, the frame packing arrangements of FIGS. 3A-3C are shown and described in detail. FIG. 4A illustrates that a decode operation is applied to the imaging facets that are resident on the stitch line, as well as a decode operation for the overlap regions. FIG. 4B illustrates that a stitching operation may now be performed on the decoded imaging facets. For example, in some implementations it may be desired to apply an algorithmic depth-based stitching across the stitched area. Additionally, a global warp operation may be performed, if necessary, across the fully-stitched faces A, B, C, D (see FIGS. 4C and 4D). Accordingly, by encoding and transmitting the overlap data, one may perform a more comprehensive stitch-based algorithm as compared with, for example, the stitching algorithms present on the image capture device. For example, a computing system (such as the computing system 1000 described with respect to FIG. 10) may have additional processing resources and additional memory as compared with, for example, an image capture device thereby resulting in a higher quality stitched image as compared with stitching operations performed by the image capture device. FIG. 4C illustrates a high-quality stitched image 420 rendered in a 4×3 format (including, for example, un-touched faces E and F); while FIG. 4D illustrates a high-quality stitched image 430 rendered in a 3×2 format (including, for example, un-touched faces E and F). These decoded and rendered images may then be displayed on, for example, a display device associated with a computing system (such as the computing system 1000 described with respect to FIG. 10).

Figure 5B:
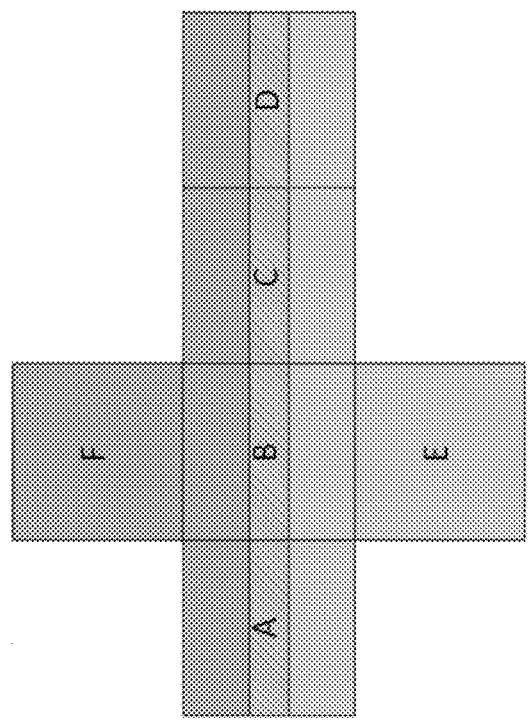
FIG. 5B is a graphical representation of a second exemplary rendering output option for panoramic content, useful in describing the principles of the present disclosure.
Figure 5A:
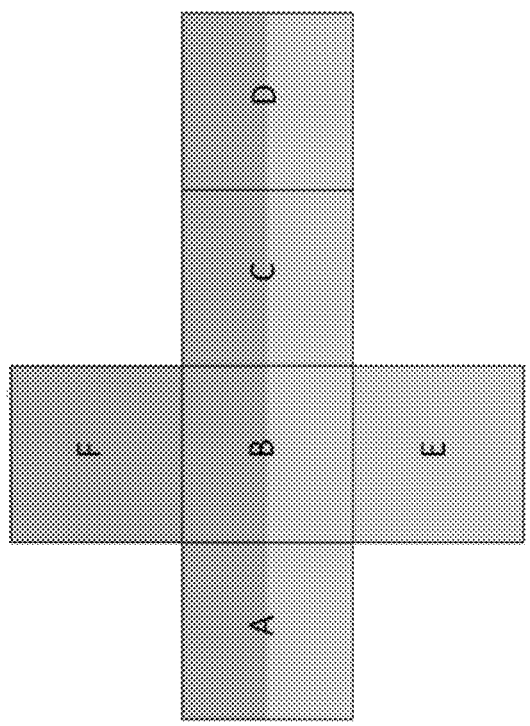
FIG. 5A is a graphical representation of a first exemplary rendering output option for panoramic content, useful in describing the principles of the present disclosure.

FIGS. 5A and 5B illustrate two rendering output options for panoramic content encoded using, for example, the methodologies of FIGS. 3A-3C. In FIG. 5A, the overlapping imaging data may be discarded at a decode operation and the stitch line may be rendered as a 'cut'. In some implementations, the technique illustrated in FIG. 5A may be utilized as a preview stream image. In other words, the image contained within facets A, B, C, D, E, F may utilized for the purpose of display with minimal processing effort. Conversely, the imaging data of FIG. 5B may be decoded and the overlapping imaging data may be utilized in order to provide for a fully-stitched full resolution image such as by utilizing the techniques illustrated in, for example, FIGS. 4A-4D.

Figure 6A:
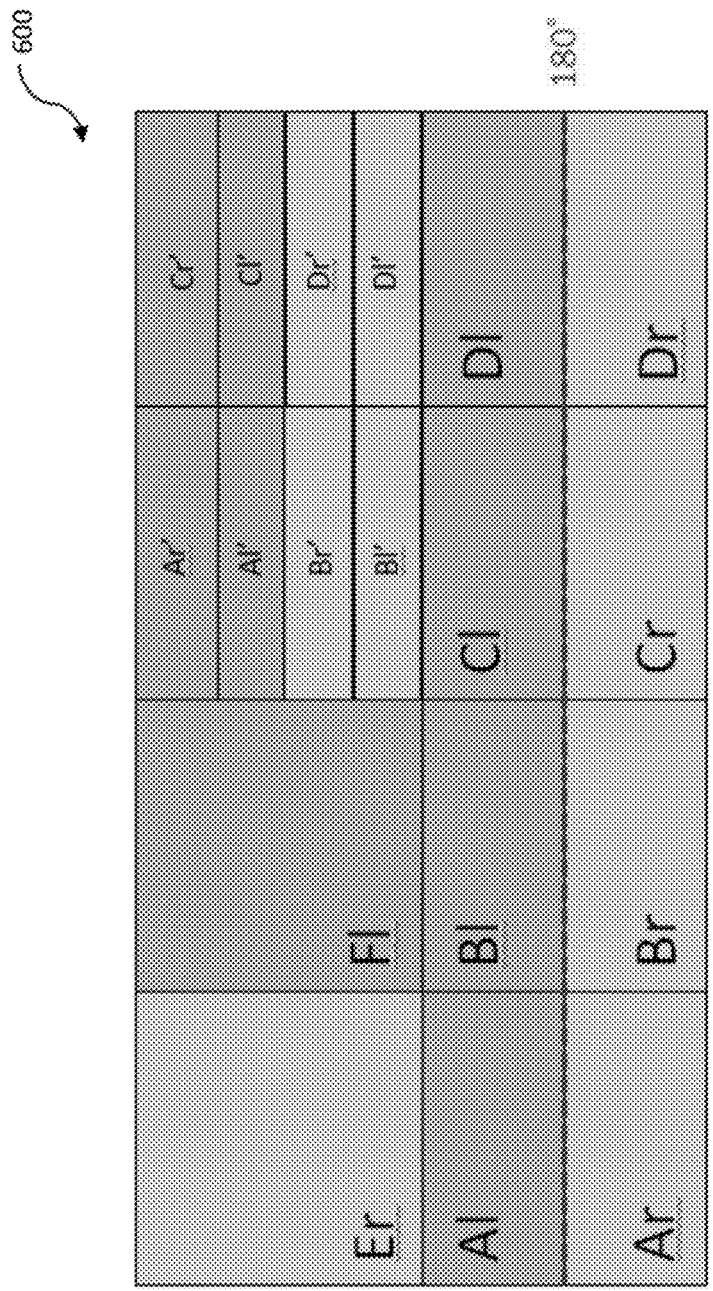
FIG. 6A is a graphical representation of a first exemplary cubic transport format, useful in describing the principles of the present disclosure.

Referring now to FIG. 6A, a first exemplary cubic transport format 600 is shown and described in detail. The exemplary transport format 600 of FIG. 6A includes a 4×2 aspect ratio. In the illustrated implementation, the right-side facet Er has been moved adjacent to the left-side facet Fl. The front facet Al, Ar; the top facet Bl, Br; the back facet Cl, Cr; and the bottom facet Dl, Dr have been placed next to one another in order to preserve the stitch line intact. The overlap imaging data Ar', Al', Br', Bl', Cr', Cl', Dr', Dl' has been incorporated into the upper right hand portion of the cubic transport format 600. Such a configuration as shown allows for twice the amount of overlap imaging data as compared with, for example, the frame packing arrangement 300 of FIG. 3A. The 4×2 aspect ratio may have advantages for some codecs chosen for encoding/decoding operations.

Additionally, metadata information may be included within the overlap imaging portions in some implementations. For example, additional information such as that disclosed within co-owned and co-pending U.S. patent application Ser. No. 15/406,175 filed Jan. 13, 2017 entitled "Apparatus and Methods for the Storage of Overlapping Regions of Imaging Data for the Generation of Optimized Stitched Images", the contents of which being incorporated herein by reference in its entirety may be included. In some implementations, the metadata information may be utilized for the stitching of the captured panoramic image for display. Additionally, in some implementations, the metadata information may include information as to the frame packing arrangement chosen (e.g., the cubic transport format 600 of FIG. 6A as but one example) and/or or the metadata information may provide information to, for example, the decoder as to the specific arrangement of the imaging facets chosen.

As depicted, the frame packing arrangement for the overlap imaging data has been optimized for continuity in order to improve upon compression efficiency for the encoding process. For example, overlap imaging data Ar' is placed adjacent to overlap imaging data Al'. Additionally, overlap imaging data Br' is placed adjacent to overlap imaging data Bl' while overlap imaging data Cr' is placed adjacent to overlap imaging data Cr and overlap imaging data Dr' is placed adjacent to overlap imaging data Dl'. In some implementations, the structure for the overlap imaging data may differ from that illustrated in FIG. 6A. For example, the overlap imaging portions may be disposed adjacent to one another in a manner similar to FIG. 6D discussed infra.

Figure 6B:
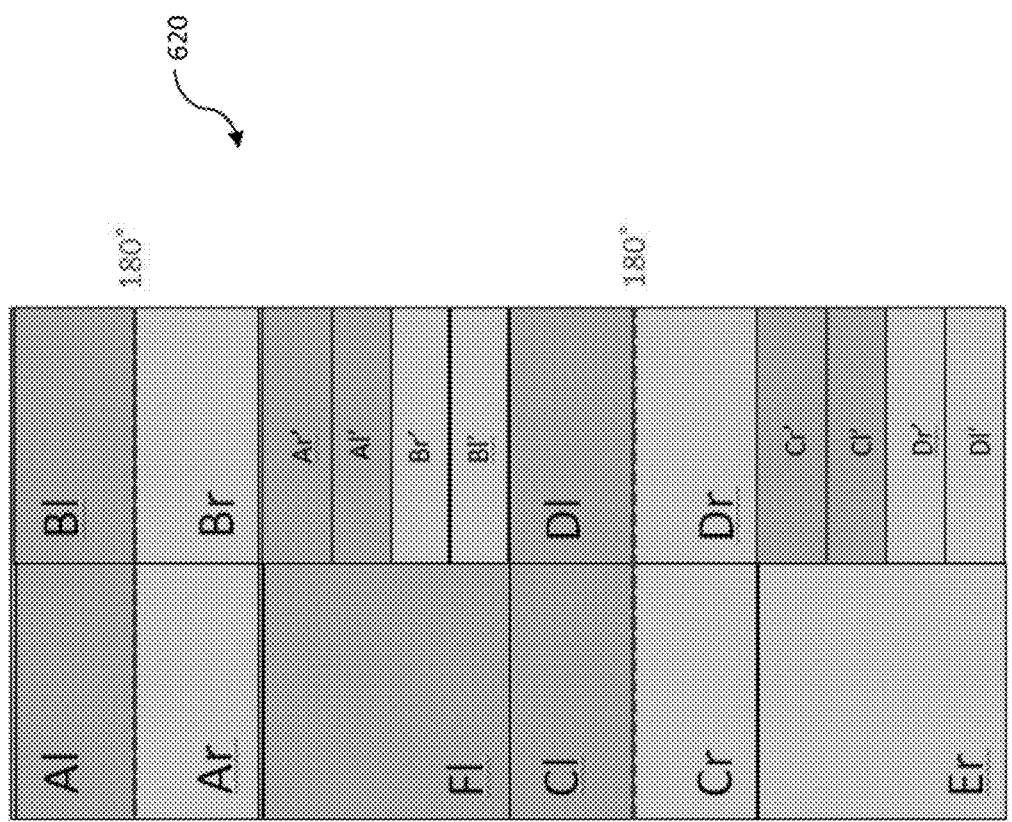
FIG. 6B is a graphical representation of a second exemplary cubic transport format, useful in describing the principles of the present disclosure.

Referring now to FIG. 6B, a second exemplary cubic transport format 620 is shown and described in detail. The exemplary transport format 620 of FIG. 6B includes a 2×4 aspect ratio. In the illustrated implementation, the stitch line has been broken apart into two separate portions, namely imaging data Al, Ar has been disposed adjacent to imaging data Bl, Br, while imaging data Cl, Cr has been disposed adjacent to imaging data Dl, Dr. Such a configuration as shown, and similar to that described above with reference to FIG. 6A, allows for twice the amount of overlap imaging data as compared with, for example, the frame packing arrangement 300 of FIG. 3A. The 2×4 aspect ratio may have advantages for some codecs chosen for encoding/decoding operations.

Additionally, metadata information may be included within the overlap imaging portions in some implementations. For example, additional information such as that disclosed within co-owned and co-pending U.S. patent application Ser. No. 15/406,175 filed Jan. 13, 2017 entitled "Apparatus and Methods for the Storage of Overlapping Regions of Imaging Data for the Generation of Optimized Stitched Images", incorporated supra may be included. In some implementations, the metadata information may be utilized for the stitching of the captured panoramic image for display. Additionally, in some implementations, the metadata information may include information as to the frame packing arrangement chosen (e.g., the cubic transport format 620 of FIG. 6B as but one example) and/or or the metadata information may provide information to, for example, the decoder as to the specific arrangement of the imaging facets chosen.

As depicted, the frame packing arrangement for the overlap imaging data has been optimized for continuity in order to improve upon compression efficiency for the encoding process. For example, overlap imaging data Ar' is placed adjacent to overlap imaging data Al'. Additionally, overlap imaging data Br' is placed adjacent to overlap imaging data Bl' while overlap imaging data Cr' is placed adjacent to overlap imaging data Cr and overlap imaging data Dr' is placed adjacent to overlap imaging data Dl'. In some implementations, the structure for the overlap imaging data may differ from that illustrated in FIG. 6B. For example, the overlap imaging portions may be disposed adjacent one another in a manner similar to FIG. 6D discussed infra.

Figure 6C:
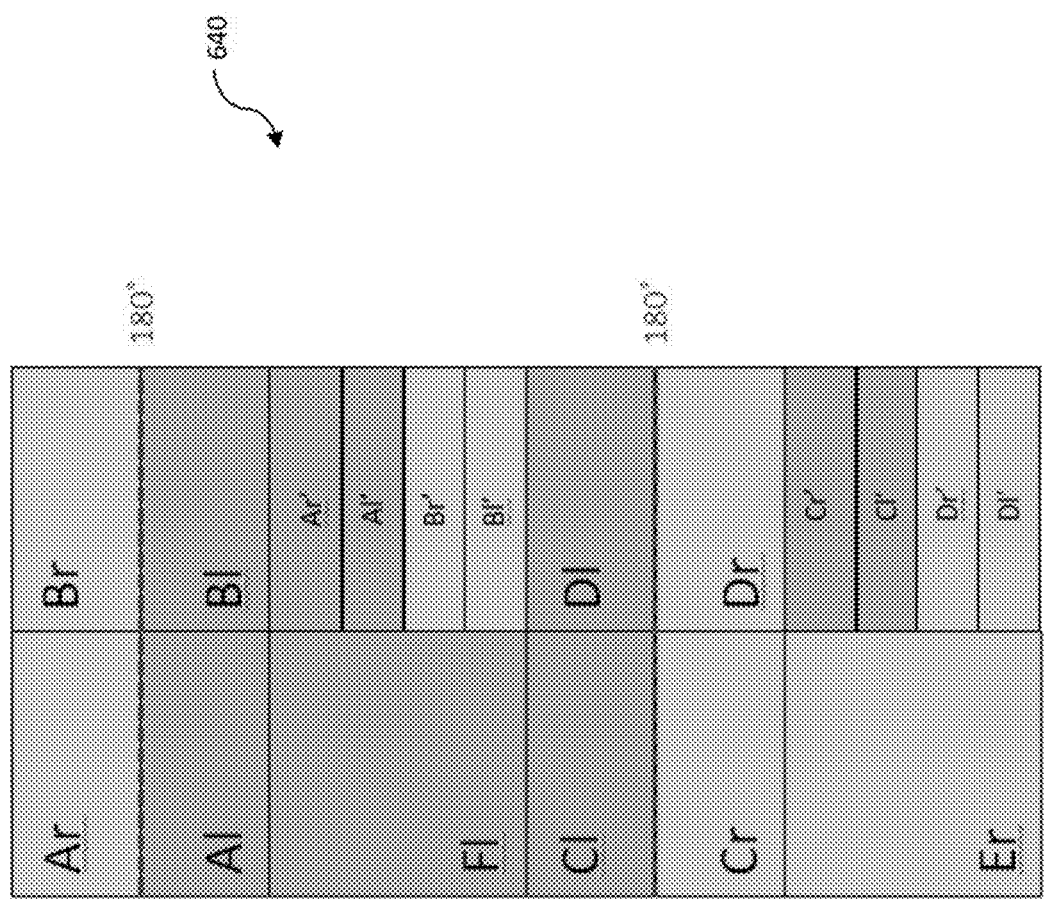
FIG. 6C is a graphical representation of a third exemplary cubic transport format, useful in describing the principles of the present disclosure.

Referring now to FIG. 6C, a third exemplary cubic transport format 640 is shown and described in detail. The exemplary transport format 640 of FIG. 6C includes a 2×4 aspect ratio, similar to that described with reference to FIG. 6B. In the illustrated implementation, the stitch line has been broken apart into two separate portions similar to that described with reference to FIG. 6B, namely imaging data Al, Ar has been disposed adjacent to imaging data Bl, Br, while imaging data Cl, Cr has been disposed adjacent to imaging data Dl, Dr. However, unlike the cubic transport format 620 illustrated in FIG. 6B, imaging portions Ar, Al and imaging portions Br, Bl have been inverted such that, for example, imaging portions Al, Fl and Cl are now contiguous. Such a configuration may improve upon, for example, the compression efficiency associated with encoding the cubic transport format 640. Such a configuration as shown, and similar to that described above with reference to FIGS. 6A and 6B, allows for twice the amount of overlap imaging data as compared with, for example, the frame packing arrangement 300 of FIG. 3A. Additionally, the 2×4 aspect ratio may have advantages for some codecs chosen for encoding/decoding operations.

Similar to that discussed with reference to FIGS. 6A and 6B, metadata information may be included within the overlap imaging portions in some implementations. For example, additional information such as that disclosed within co-owned and co-pending U.S. patent application Ser. No. 15/406,175 filed Jan. 13, 2017 entitled "Apparatus and Methods for the Storage of Overlapping Regions of Imaging Data for the Generation of Optimized Stitched Images", incorporated supra may be included. In some implementations, the metadata information may be utilized for the stitching of the captured panoramic image for display. Additionally, in some implementations, the metadata information may include information as to the frame packing arrangement chosen (e.g., the cubic transport format 640 of FIG. 6C as but one example) and/or or the metadata information may provide information to, for example, the decoder as to the specific arrangement of the imaging facets chosen.

As depicted, the frame packing arrangement for the overlap imaging data has been optimized for continuity in order to improve upon compression efficiency for the encoding process. For example, overlap imaging data Ar' is placed adjacent to overlap imaging data Al'. Additionally, overlap imaging data Br' is placed adjacent to overlap imaging data Bl' while overlap imaging data Cr' is placed adjacent to overlap imaging data Cr and overlap imaging data Dr' is placed adjacent to overlap imaging data Dl'. In some implementations, the structure for the overlap imaging data may differ from that illustrated in FIG. 6C. For example, the overlap imaging portions may be disposed adjacent one another in a manner similar to FIG. 6D discussed infra.

Figure 6D:
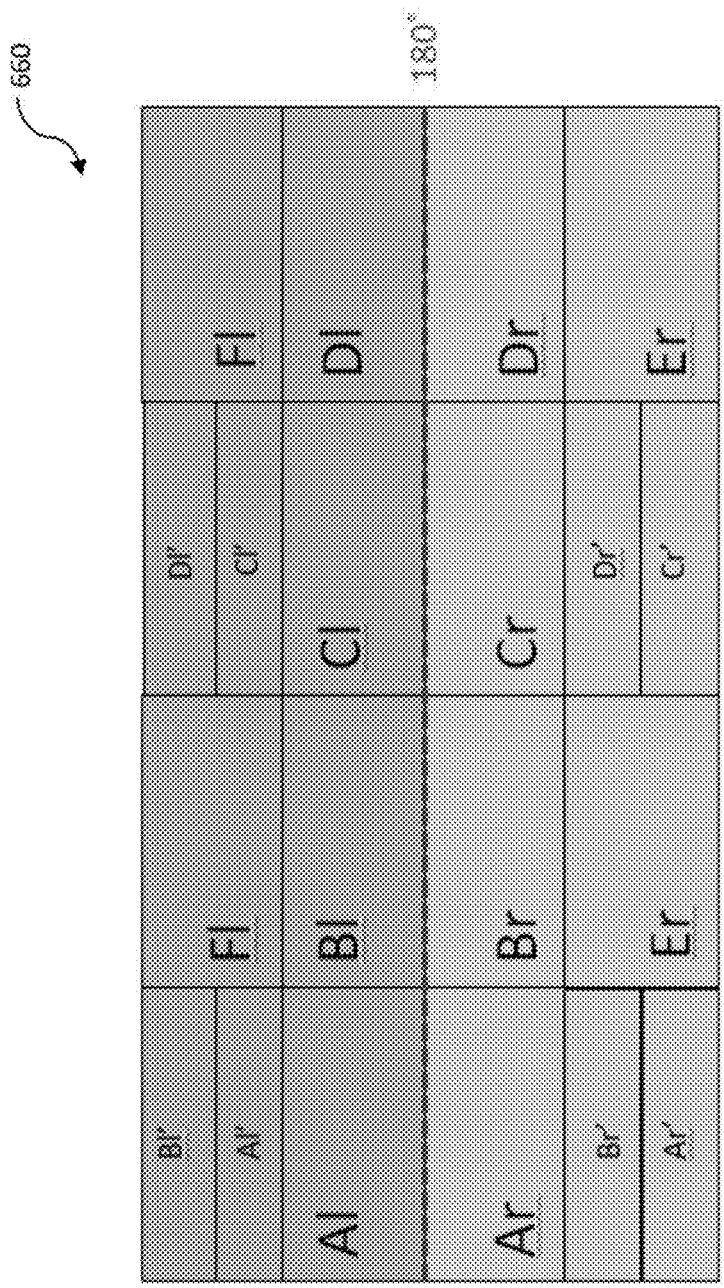
FIG. 6D is a graphical representation of a fourth exemplary cubic transport format, useful in describing the principles of the present disclosure.

Referring now to FIG. 6D, a fourth exemplary cubic transport format 660 is shown and described in detail. The exemplary transport format 660 of FIG. 6D includes a 4×2 aspect ratio, similar to that described with reference to FIG. 6A. In the illustrated implementation, the left-side facet Fl has been split up so as to be contiguous with imaging facets Bl and Dl. In some implementations, the top half of Fl may be disposed adjacent to imaging facet Bl, while the bottom half of Fl may be disposed adjacent to imaging facet Dl. Similarly, the right-side facet Er has been split up so as to be contiguous with imaging facets Br and Dr. In some implementations, the top half of Er may be disposed adjacent to imaging facet Br, while the bottom half of Er may be disposed adjacent to imaging facet Dr. Such a configuration may improve upon, for example, the compression efficiency associated with encoding of the cubic transport format 660. Such a configuration as shown, and similar to that described above with reference to FIGS. 6A-6C, allows for twice the amount of overlap imaging data as compared with, for example, the frame packing arrangement 300 of FIG. 3A. Additionally, the 4×2 aspect ratio may have advantages for some codecs chosen for encoding/decoding operations.

Similar to that discussed with reference to FIGS. 6A-6C, metadata information may be included within the overlap imaging portions in some implementations. For example, additional information such as that disclosed within co-owned and co-pending U.S. patent application Ser. No. 15/406,175 filed Jan. 13, 2017 entitled "Apparatus and Methods for the Storage of Overlapping Regions of Imaging Data for the Generation of Optimized Stitched Images", incorporated supra may be included. In some implementations, the metadata information may be utilized for the stitching of the captured panoramic image for display. Additionally, in some implementations, the metadata information may include information as to the frame packing arrangement chosen (e.g., the cubic transport format 660 of FIG. 6D as but one example) and/or or the metadata information may provide information to, for example, the decoder as to the specific arrangement of the imaging facets chosen.

As depicted, the frame packing arrangement for the overlap imaging data has been optimized for continuity in order to improve upon compression efficiency for the encoding process. For example, overlap imaging data Al' is placed adjacent to overlap imaging data Bl'. Additionally, overlap imaging data Br' is placed adjacent to overlap imaging data Ar' while overlap imaging data Cr is placed adjacent to overlap imaging data Dl' and overlap imaging data Dr' is placed adjacent to overlap imaging data Cr'. In some implementations, the structure for the overlap imaging data may differ from that illustrated in FIG. 6D. For example, in some implementations it may be desirable to place overlap imaging portion Al' adjacent to overlap imaging Ar', overlap imaging portion Bl' adjacent to overlap imaging Br', overlap imaging portion Cl' adjacent to overlap imaging Cr', and overlap imaging portion Dl' adjacent to overlap imaging Dr'. These and other variants would be readily apparent to one of ordinary skill given the contents of the present disclosure.

Exemplary Methodologies—

Figure 7:
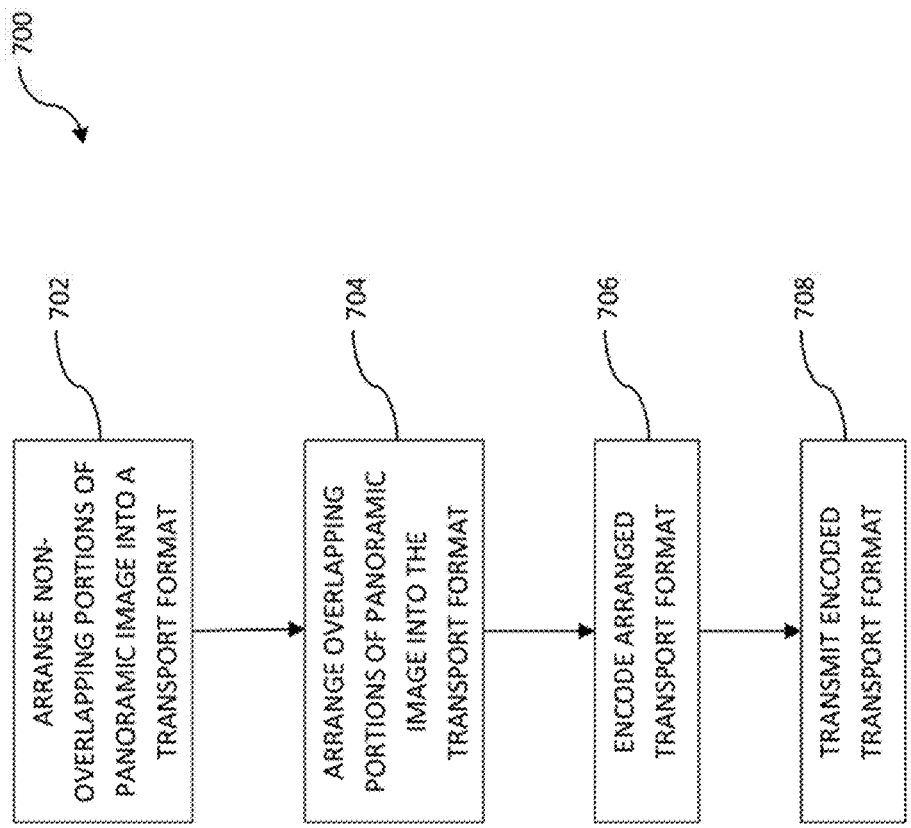
FIG. 7 is a logical flow diagram illustrating an exemplary embodiment for the transmission of an encoded transport format, useful in describing the principles of the present disclosure.

Referring now to FIG. 7, an exemplary methodology 700 for transmitting encoded transport formats (such as those described with respect to FIGS. 3A-3C and FIGS. 6A-6D described supra) is shown and described in detail. At operation 702, non-overlapping portions of a panoramic image captured by an image capture device are arranged into a transport format. For example, as discussed with respect to FIGS. 3A-3C, the non-overlapping portions of the image may be arranged into a 4×3 aspect ratio. In some implementations, the non-overlapping portions of the image may be arranged into a 4×2 aspect ratio as illustrated in, for example, FIGS. 6A and 6D. In some implementations, the non-overlapping portions of the image may be arranged into a 2×4 aspect ratio as illustrated in FIGS. 6B and 6C or may be arranged into a 3×2 aspect ratio. These and other variants would be readily apparent to one of ordinary skill given the contents of the present disclosure.

At operation 704, the overlapping portions of the panoramic image (e.g., overlapping portions 250 depicted in FIG. 2B) may be arranged into the transport format of operation 702. For example, the overlapping portions may be arranged into a separate facet of the transport format such as that described with respect to FIG. 3A. In some implementations, the overlapping portions may be arranged so as to be contiguous with non-overlapping portions of the image as depicted in, for example, FIG. 3B. In yet other implementations, the overlapping portions of the panoramic image may be arranged as an image watermark such as that depicted in FIG. 3C. Additionally, individual overlapping portions may be arranged so as to maintain continuity as depicted in, for example, FIG. 6C or 6D. These and other variants would be readily apparent to one of ordinary skill given the contents of the present disclosure. At operation 706, the arranged transport format may be encoded using, for example, and encoder and at operation 708, the encoded transport format may be transmitted.

Figure 8:
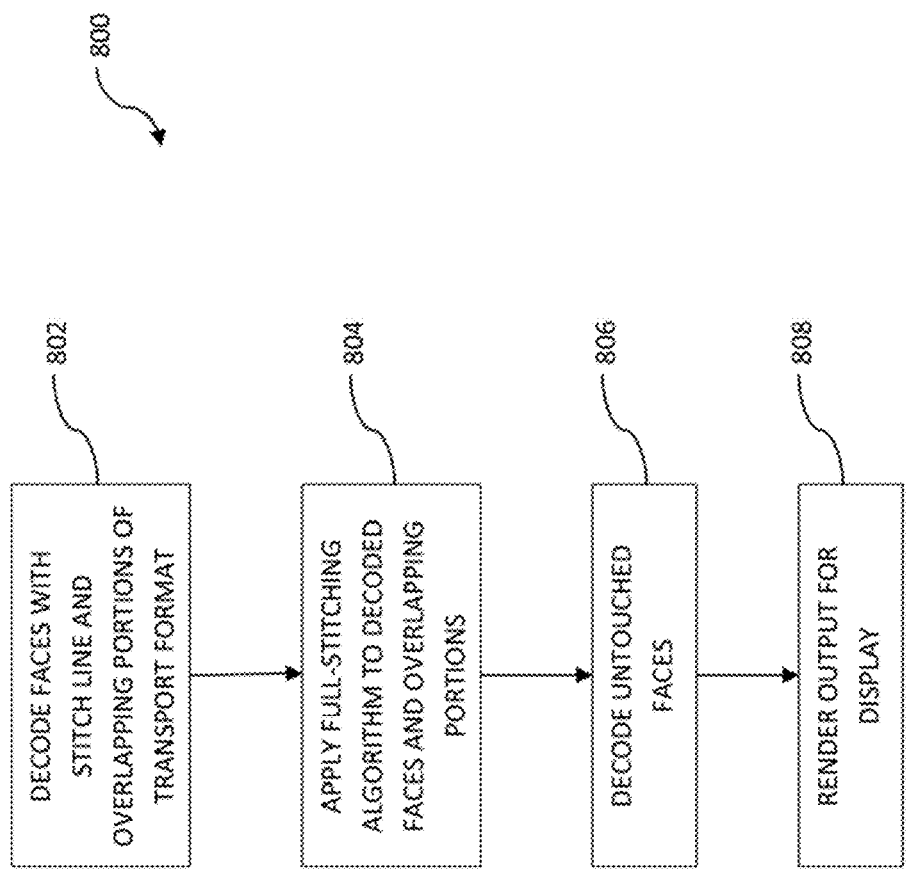
FIG. 8 is a logical flow diagram illustrating an exemplary embodiment for the rendering of output for display, useful in describing the principles of the present disclosure.

Referring now to FIG. 8, an exemplary methodology 800 for the rendering of an encoded transport format (such as that described with respect to FIG. 7) is shown and described in detail. At operation 802, the faces associated with the stitch line and overlapping portions of the transport format are decoded using, for example, a decoder. For example, with respect to the frame packing arrangement 300 of FIG. 3A, image facets Al, Ar, Bl, Br, Cl, Cr, Dl, Dr may be decoded along with overlapping image facet 302. Other variants of operation 802 would be readily apparent to one of ordinary skill given the contents of the present disclosure.

At operation 804, a full-stitching algorithm may be applied to the decoded faces and decoded overlapping portions. For example, an algorithmic depth-based stitch may be applied to the decoded faces and decoded overlapping portions. In some implementations, a global warp may be applied, if necessary across the stitched decoded faces.

At operation 806, the untouched faces (i.e., those faces captured by a single lens of a multi-lens image capture device) may be decoded. In some implementations, operation 806 may be performed prior to operations 802 and 804. In other implementations, operation 806 may be performed in parallel with operation 802 and/or operation 804. In yet other implementations, operation 806 may be performed subsequent to the performance of operations 802 and 804. These and other variants would be readily apparent to one of ordinary skill given the contents of the present disclosure. At operation 808, the decoded and stitched transport format may be rendered as an output for display.

Figure 9:
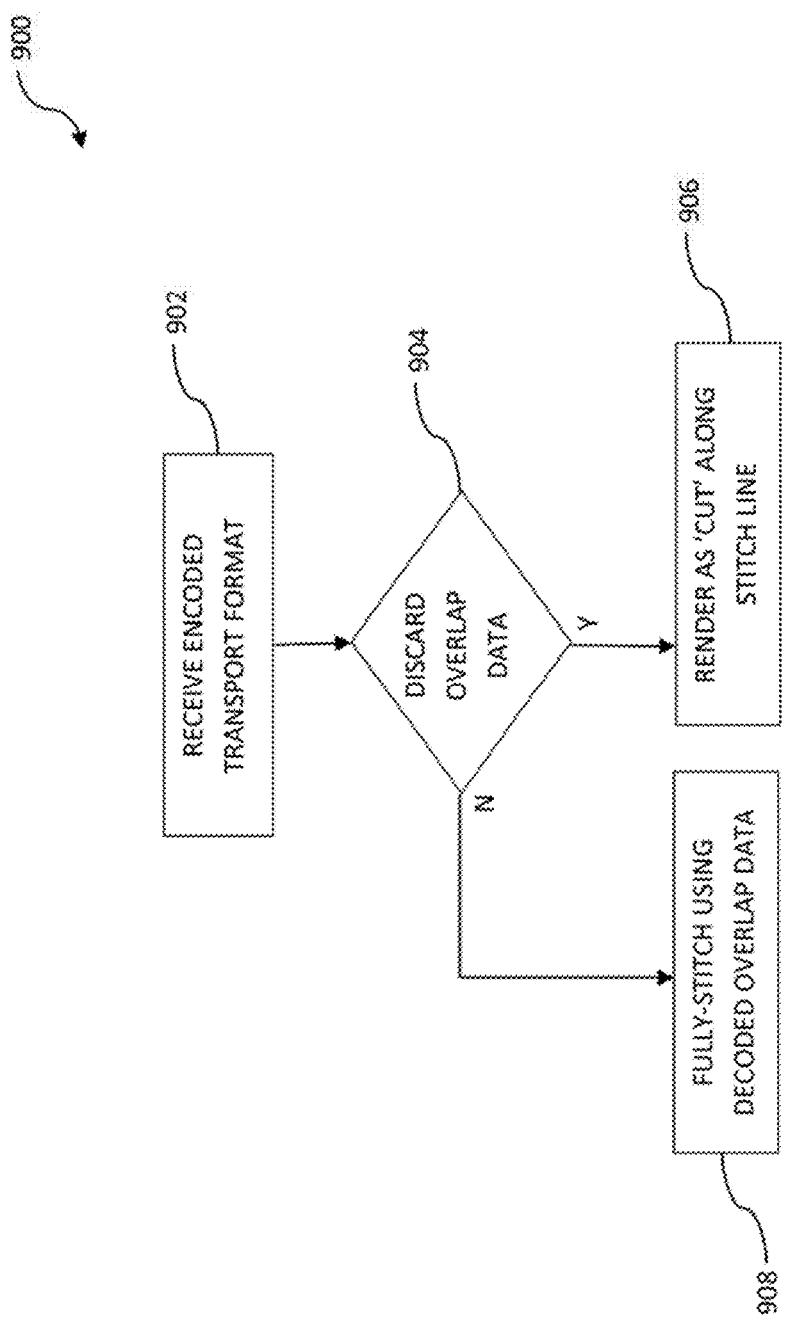
FIG. 9 is a logical flow diagram illustrating an exemplary embodiment for various ways by which a received encoded transport format may be rendered for display, useful in describing the principles of the present disclosure.

Referring now to FIG. 9, an exemplary methodology 900 illustrating various ways by which a received encoded transport format may be rendered for display is shown and described in detail. At operation 902, an encoded transport format is received. In some implementations, the encoded transport format received is the encoded transport format transmitted at operation 708. The received encoded transport format includes both overlapping and non-overlapping portions.

At operation 904, a decision made as to whether the overlapping portion of the imaging data should be discarded. For example, in some implementations in which a preview display of the image is desired, the overlapping portion of the imaging data may be discarded. In some implementations, the decision may be made based on processing requirements, timing constraints, and/or memory requirements. For example, where the imaging data needs to be displayed within a given time constraint and the fully-stitched image may take longer to process than the given time constraint, the overlapping imaging data may simply be discarded. Conversely, where processing resources are available and timing constraints are less of an issue, the overlapping imaging data may not be discarded. These and other variants would be readily apparent to one of ordinary skill given the contents of the present disclosure.

If the decision at operation 904 is to discard the overlapping imaging data, at operation 906 may be rendered as a 'cut' operation along the stitch line for the panoramic image. If, however, the decision at operation 904 is to not discard the overlapping imaging data, at operation 908, the overlapping imaging data is used to fully-stitch the panoramic imaging data. In some implementations, an algorithmic depth-based stitch may be applied to the decoded faces and decoded overlapping portions. Additionally, a global warp may be applied, if necessary across the stitched decoded faces in some implementations.

Exemplary Apparatus—

Figure 10:
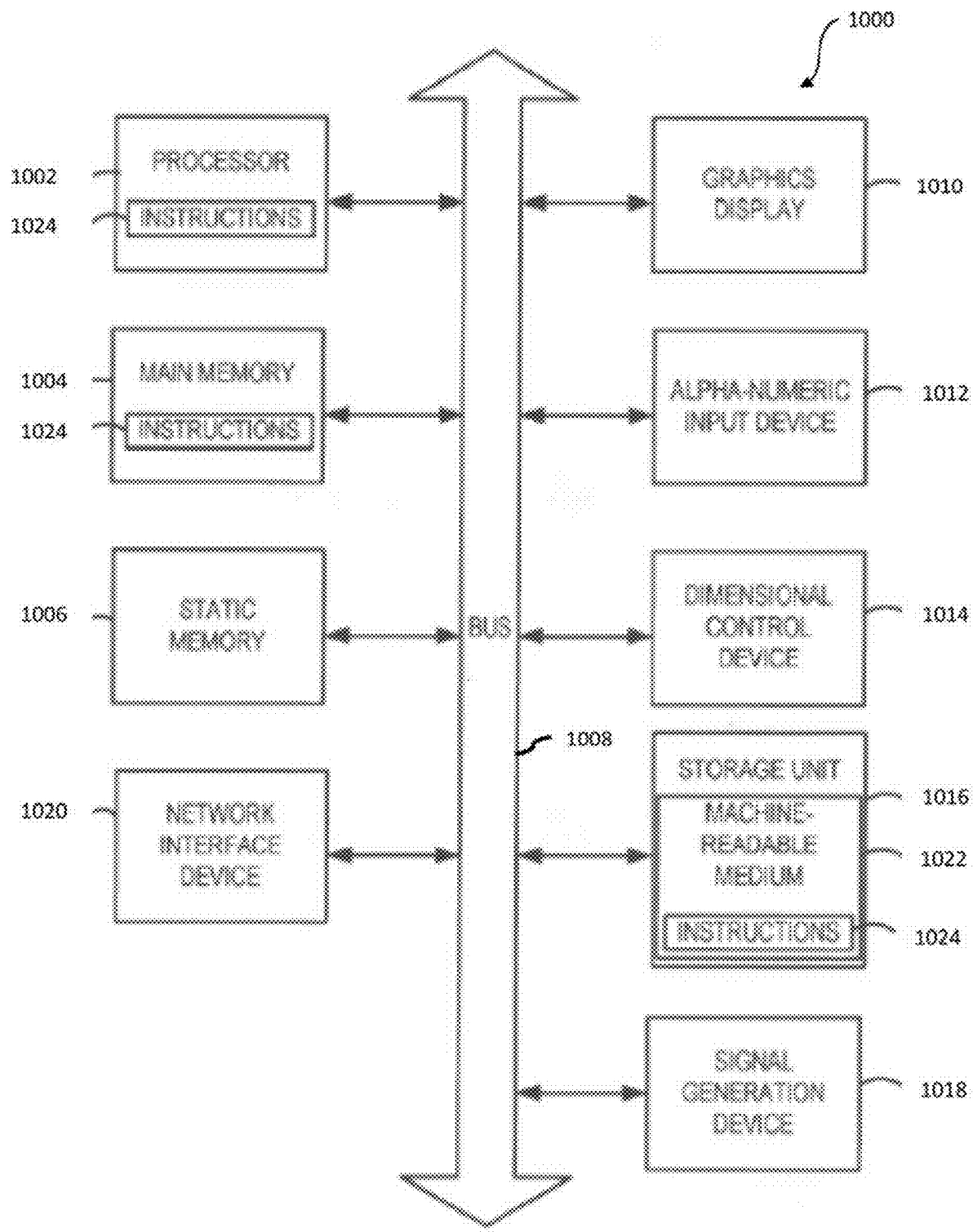
FIG. 10 is a block diagram of an exemplary implementation of a computing device, useful in encoding and/or decoding the exemplary frame packing arrangements as described herein.

FIG. 10 is a block diagram illustrating components of an example computing system 1000 able to read instructions from a computer-readable medium and execute them in one or more processors (or controllers). The computing system in FIG. 10 may represent an implementation of, for example, an image/video processing device for encoding and/or decoding (e.g., an image/video encoder and/or decoder) of the various frame packing arrangements as discussed with respect to FIGS. 1A-6D or for performing the methodologies discussed with respect to FIGS. 7-9.

The computing system 1000 may be used to execute instructions 1024 (e.g., program code or software) for causing the computing system 1000 to perform any one or more of the encoding/decoding methodologies (or processes) described herein. In alternative embodiments, the computing system 1000 operates as a standalone device or a connected (e.g., networked) device that connects to other computer systems. The computing system 1000 may include, for example, a personal computer (PC), a tablet PC, a notebook computer, or other device capable of executing instructions 1024 (sequential or otherwise) that specify actions to be taken. In another embodiment, the computing system 1000 may include a server. In a networked deployment, the computing system 1000 may operate in the capacity of a server or client in a server-client network environment, or as a peer device in a peer-to-peer (or distributed) network environment. Further, while only a single computer system 1000 is illustrated, a plurality of computing systems 1000 may operate to jointly execute instructions 1024 to perform any one or more of the encoding/decoding methodologies discussed herein.

The example computing system 1000 includes one or more processing units (generally processor apparatus 1002). The processor apparatus 1002 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 1000 may also include a main memory 1004. The computing system 1000 may include a storage unit 1016. The processor 1002, memory 1004 and the storage unit 1016 may communicate via a bus 1008.

In addition, the computing system 1000 may include a static memory 1006, a display driver 1010 (e.g., to drive a plasma display panel (PDP), a liquid crystal display (LCD), a projector, or other types of displays). The computing system 1000 may also include input/output devices, e.g., an alphanumeric input device 1012 (e.g., touch screen-based keypad or an external input device such as a keyboard), a dimensional (e.g., 2-D or 3-D) control device 1014 (e.g., a touch screen or external input device such as a mouse, a trackball, a joystick, a motion sensor, or other pointing instrument), a signal capture/generation device 1018 (e.g., a speaker, camera, and/or microphone), and a network interface device 1020, which also are configured to communicate via the bus 1008.

Embodiments of the computing system 1000 corresponding to a client device may include a different configuration than an embodiment of the computing system 1000 corresponding to a server. For example, an embodiment corresponding to a server may include a larger storage unit 1016, more memory 1004, and a faster processor 1002 but may lack the display driver 1010, input device 1012, and dimensional control device 1014. An embodiment corresponding to an action camera may include a smaller storage unit 1016, less memory 1004, and a power efficient (and slower) processor 1002 and may include multiple camera capture devices 1018.

The storage unit 1016 includes a computer-readable medium 1022 that on which is stored instructions 1024 (e.g., software) embodying any one or more of the methodologies or functions described herein. The instructions 1024 may also reside, completely or at least partially, within the main memory 1004 or within the processor 1002 (e.g., within a processor's cache memory) during execution thereof by the computing system 1000, the main memory 1004 and the processor 1002 also constituting computer-readable media. The instructions 1024 may be transmitted or received over a network via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store the instructions 1024. The term "computer-readable medium" shall also be taken to include any medium that is capable of storing instructions 1024 for execution by the computing system 1000 and that cause the computing system 1000 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and mini-computers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A method for encoding a panoramic image, the method comprising:
    receiving a panoramic image that has been captured by two or more image capture devices, the panoramic image comprising at least one overlapping portion that has been captured by at least two of the two or more image capture devices;
    arranging non-overlapping portions of the panoramic image into a transport format;
    arranging the at least one overlapping portion of the panoramic image within the transport format; and
    encoding the arranged non-overlapping portions and the arranged at least one overlapping portion of the panoramic image;
    wherein the transport format comprises a cubemap projection, the cubemap projection comprising a stitch line that divides four imaging facets of the cubemap projection to generate respective first portions and second portions of the four imaging facets, and the arranging of the at least one overlapping portion of the panoramic image comprises arranging the at least one overlapping portion of the panoramic image as an image representation of the at least one overlapping portion within at least one of the respective first portions and second portions of the divided four imaging facets of the cubemap projection.

2. The method of claim 1, wherein the division comprises bisection, and the generated respective first portion and second portion comprise a first half and a second half, respectively.

3. The method of claim 1, further comprising arranging the transport format in a 4×3 aspect ratio, the 4×3 aspect ratio comprising four facets in a width dimension and three facets in a vertical dimension.

4. The method of claim 1, further comprising arranging the transport format in a 4×2 aspect ratio, the 4×2 aspect ratio comprising four facets in a width dimension and two facets in a vertical dimension.

5. The method of claim 1, wherein the arranging of the overlapping portion of the panoramic image further comprises arranging the overlapping portion of the panoramic image such that the overlapping portion is arranged in a substantially contiguous manner.

6. A non-transitory computer-readable storage apparatus, the computer-readable storage apparatus comprising a storage medium comprising computer-readable instructions, the computer-readable instructions being configured to, when executed by a processor apparatus:
    receive a panoramic image that has been captured by two or more image capture devices, the panoramic image comprising an overlapping portion that has been captured by at least two of the two or more image capture devices;

arrange non-overlapping portions of the panoramic image into a transport format;

arrange the overlapping portion of the panoramic image within the transport format; and encode the arranged non-overlapping portions and the arranged overlapping portion of the panoramic image in order to produce an encoded image;

wherein the transport format comprises a cubemap projection, the cubemap projection comprising a stitch line that bisects four imaging facets of the cubemap projection to produce respective first halves and second halves of the four imaging facets, and the arrangement of the overlapping portion of the panoramic image comprises an arrangement of the overlapping portion of the panoramic image between the respective first halves and second halves of the bisected four imaging facets of the cubemap projection.

7. The non-transitory computer-readable storage apparatus of claim 6, wherein the arrangement of the overlapping portion of the panoramic image further comprises an arrangement of the overlapping portion of the panoramic image such that the overlapping portion is arranged in a substantially contiguous manner.

8. An encoder apparatus, the encoder apparatus comprising:

a processor apparatus; and a non-transitory computer-readable storage apparatus, the computer-readable storage apparatus comprising a storage medium comprising computer-readable instructions, the computer-readable instructions being configured to, when executed by the processor apparatus:

receive a panoramic image that has been captured by two or more image capture devices, the panoramic image comprising an overlapping portion that has been captured by at least two of the two or more image capture devices;

arrange non-overlapping portions of the panoramic image into a transport format;

arrange the overlapping portion of the panoramic image within the transport format; and encode the arranged non-overlapping portions and the arranged overlapping portion of the panoramic image in order to produce an encoded image;

wherein the transport format comprises a cubemap projection, the cubemap projection comprising a stitch line that bifurcates four imaging facets of the cubemap projection to produce respective first portions and second portions associated with the four imaging facets and the arrangement of the overlapping portion of the panoramic image comprises an arrangement of the overlapping portion of the panoramic image between the respective first portions and second portions associated with the bifurcated four imaging facets of the cubemap projection.

9. The encoder apparatus of claim 8, wherein the arrangement of the overlapping portion of the panoramic image comprises an arrangement of the overlapping portion as a watermark within the four bifurcated imaging facets.

10. The encoder apparatus of claim 8, wherein the computer-readable instructions are further configured to, when executed by the processor apparatus:

arrange the transport format into a 4×3 aspect ratio, the 4×3 aspect ratio comprising four facets in a width dimension and three facets in a vertical dimension.

11. The encoder apparatus of claim 8, wherein the arrangement of the overlapping portion of the panoramic image further comprises an arrangement for the overlapping portion of the panoramic image such that the overlapping portion is arranged in a substantially contiguous manner.

12. The encoder apparatus of claim 11, wherein the arrangement of the overlapping portion in the substantially contiguous manner improves upon a compression efficiency for the transport format as compared with another transport format in which an overlapping portion is not arranged in a contiguous manner.

13. The encoder apparatus of claim 8, wherein the computer-readable instructions are further configured to, when executed by the processor apparatus:

arrange the transport format in a 4×2 aspect ratio, the 4×2 aspect ratio comprising four facets in a width dimension and two facets in a vertical dimension.

14. The encoder apparatus of claim 8, wherein the encode of the arranged overlapping portion of the panoramic image comprises an encode of the overlapping portion of the panoramic image as metadata.

15. The method of claim 1, wherein the encoding of the arranged overlapping portion of the panoramic image comprises encoding the overlapping portion of the panoramic image as metadata.

16. The non-transitory computer-readable storage apparatus of claim 6, wherein the arrangement of the overlapping portion of the panoramic image comprises an arrangement of the overlapping portion as a watermark within the four bifurcated imaging facets.

17. The non-transitory computer-readable storage apparatus of claim 6, wherein the computer-readable instructions are further configured to, when executed by the processor apparatus:

arrange the transport format in a 4×3 aspect ratio, the 4×3 aspect ratio comprising four facets in a width dimension and three facets in a vertical dimension.

18. The non-transitory computer-readable storage apparatus of claim 6, wherein the computer-readable instructions are further configured to, when executed by the processor apparatus:

arrange the transport format in a 4×2 aspect ratio, the 4×2 aspect ratio comprising four facets in a width dimension and two facets in a vertical dimension.

19. The non-transitory computer-readable storage apparatus of claim 7, wherein the arrangement of the overlapping portion in the substantially contiguous manner improves upon a compression efficiency for the transport format as compared with another transport format in which an overlapping portion is not arranged in a contiguous manner.

20. The non-transitory computer-readable storage apparatus of claim 6, wherein the encode of the arranged overlapping portion of the panoramic image comprises an encode of the overlapping portion of the panoramic image as metadata.

* * * * *